US012089516B2

(12) United States Patent
Sporrer et al.

(10) Patent No.: US 12,089,516 B2
(45) Date of Patent: *Sep. 17, 2024

(54) AUTOMATED LEVELING AND DEPTH CONTROL SYSTEM OF A WORK MACHINE AND METHOD THEREOF

(71) Applicant: DEERE & COMPANY, Moline, IL (US)

(72) Inventors: Adam D. Sporrer, Ankeny, IA (US); Anthony Sikora, Urbandale, IA (US); Ricky B. Theilen, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 869 days.

This patent is subject to a terminal disclaimer.

(21) Appl. No.: 16/995,170

(22) Filed: Aug. 17, 2020

(65) Prior Publication Data

US 2020/0390021 A1 Dec. 17, 2020

Related U.S. Application Data

(63) Continuation of application No. 15/884,950, filed on Jan. 31, 2018, now Pat. No. 10,750,653, which is a (Continued)

(51) Int. Cl.
*A01B 63/22* (2006.01)
*A01B 5/04* (2006.01)
(Continued)

(52) U.S. Cl.
CPC ............... *A01B 63/22* (2013.01); *A01B 5/04* (2013.01); *A01B 49/065* (2013.01);
(Continued)

(58) Field of Classification Search
CPC ....... A01B 63/22; A01B 63/32; A01B 63/008; A01B 63/1112; A01B 5/04; A01B 49/065;
(Continued)

(56) References Cited

U.S. PATENT DOCUMENTS 4,129,258 A 12/1978 Mott et al.
4,821,806 A 4/1989 Winter
(Continued)

FOREIGN PATENT DOCUMENTS

CA 1117626 A 2/1982
CA 2837715 A1 12/2012
(Continued)

*Primary Examiner* — Thomas B Will
*Assistant Examiner* — Joel F. Mitchell
(74) *Attorney, Agent, or Firm* — Taft Stettinius & Hollister LLP; Stephen F. Rost

(57) ABSTRACT

An agricultural implement includes a transversely extending frame forming a first, a second, and a third frame section. A first actuator is coupled to the first frame section, a second actuator coupled to the second frame section, and a third actuator coupled to the third frame section. Sensors are coupled to each frame section to detect a height of the respective frame section relative to an underlying surface. A control unit is disposed in electrical communication with the sensors and operably controls the actuators to adjust the height of each frame section.

25 Claims, 12 Drawing Sheets

Related U.S. Application Data continuation-in-part of application No. 15/171,632, filed on Jun. 2, 2016, now Pat. No. 10,440,876, which is a continuation-in-part of application No. 15/058,745, filed on Mar. 2, 2016, now Pat. No. 9,961,823.

(51) Int. Cl.
 *A01B 49/06* (2006.01)
 *A01B 63/00* (2006.01)
 *A01B 63/111* (2006.01)
 *A01B 63/32* (2006.01)

(52) U.S. Cl.
 CPC ........ *A01B 63/008* (2013.01); *A01B 63/1112* (2013.01); *A01B 63/32* (2013.01)

(58) Field of Classification Search
 CPC .. A01B 63/111; A01B 63/1115; A01B 63/114
 See application file for complete search history.

(56) References Cited

U.S. PATENT DOCUMENTS

| | | | |
|---|---|---|---|
| 4,943,158 A | 7/1990 | Perl et al. | |
| 6,089,327 A | 7/2000 | Kimura et al. | |
| 6,305,478 B1 | 10/2001 | Friggstad | |
| 6,671,582 B1 | 12/2003 | Hanley | |
| 8,235,130 B2 | 8/2012 | Henry et al. | |
| 8,857,530 B2 | 10/2014 | Henry | |
| 9,572,296 B2 * | 2/2017 | Henry et al. | A01B 63/22 |
| 9,609,799 B2 * | 4/2017 | Henry | A01B 5/04 |
| 9,609,800 B2 | 4/2017 | Henry | |
| 9,615,499 B2 | 4/2017 | Kowalchuk | |
| 9,648,799 B2 | 5/2017 | Ohnsat | |
| 11,147,206 B2 * | 10/2021 | Long et al. | A01B 63/114 |
| 11,696,523 B2 * | 7/2023 | Blunier et al. | A01B 63/14 172/1 |
| 2004/0016556 A1 | 1/2004 | Barber | |
| 2007/0204582 A1 | 9/2007 | Coers et al. | |
| 2013/0299601 A1 | 11/2013 | Ballu | |
| 2015/0053439 A1 | 2/2015 | Ohnsat | |
| 2015/0153456 A1 | 6/2015 | Feller et al. | |
| 2015/0156949 A1 | 6/2015 | Henry | |
| 2017/0034989 A1 | 2/2017 | Westlind et al. | |
| 2017/0251587 A1 | 9/2017 | Sporrer | |
| 2018/0153088 A1 | 6/2018 | Sporrer et al. | |

FOREIGN PATENT DOCUMENTS

| | | |
|---|---|---|
| EP | 1273216 A1 | 11/2007 |
| EP | 2917371 A1 | 9/2015 |
| WO | 2004004439 A1 | 1/2004 |
| WO | 2012125109 A1 | 9/2012 |
| WO | 2012167258 A1 | 12/2012 |
| WO | 2014075083 A1 | 5/2014 |

* cited by examiner

Primary Action Desired

Valve Action

| Action Required | ROW | RIW | RMF LMF | LIW | LOW |
|---|---|---|---|---|---|
| Raise Overall | C | C | O | C | C |
| Lower Overall | C | C | O | C | C |
| Raise MF | C | C | O | C | C |
| Lower MF | C | C | O | C | C |
| Raise LIW | C | C | C | O | C |
| Lower LIW | C | C | C | O | C |
| Raise LOW | C | C | C | C | O |
| Lower LOW | C | C | C | C | O |
| Raise RIW | C | O | C | C | C |
| Lower RIW | C | O | C | C | C |
| Raise ROW | O | C | C | C | C |
| Lower ROW | O | C | C | C | C |

Cylinder Action

| Action Required | ROW | RIW | RMF LMF | LIW | LOW |
|---|---|---|---|---|---|
| Raise Overall | E | E | E | E | E |
| Lower Overall | R | R | R | R | R |
| Raise MF | E | E | E | E | E |
| Lower MF | R | R | R | R | R |
| Raise LIW | - | - | - | E | E |
| Lower LIW | - | - | - | R | R |
| Raise LOW | - | - | - | - | E |
| Lower LOW | - | - | - | - | R |
| Raise RIW | E | E | - | - | - |
| Lower RIW | R | R | - | - | - |
| Raise ROW | E | - | - | - | - |
| Lower ROW | R | - | - | - | - |

Fig. 4

AUTOMATED LEVELING AND DEPTH CONTROL SYSTEM OF A WORK MACHINE AND METHOD THEREOF

RELATED APPLICATIONS

The present application is a continuation of U.S. patent application Ser. No. 15/884,950, filed Jan. 31, 2018, which is a continuation-in-part of U.S. patent application Ser. No. 15/171,632, filed Jun. 2, 2016, which is a continuation-in-part of U.S. patent application Ser. No. 15/058,745, filed Mar. 2, 2016, the disclosures of which are hereby incorporated by reference in their entirety.

FIELD OF THE DISCLOSURE

The present disclosure relates to a hydraulic control system, and in particular to a hydraulic control system of an implement of a work machine.

BACKGROUND OF THE DISCLOSURE

In the agricultural industry, wide implements such as field cultivators and the like include a main frame and adjacent outrigger or wing frames that are hinged or pivotably coupled thereto. Conventional control systems require an operator or user to estimate how level the different frames are relative to one another, and also whether each individual frame is level from fore-to-aft. Moreover, many of these systems require human intervention to mechanically adjust the frames to achieve a level position across the width of the machine and in the fore-to-aft direction. This, however, can introduce human error and makes it difficult to achieve precise machine leveling.

In the present disclosure, a control system is described and illustrated for providing automatic machine leveling across multiple frame sections of a work machine and leveling from front to back of each individual frame section.

SUMMARY

In one embodiment of the present disclosure, an agricultural implement includes a transversely extending frame forming at least a first frame section, a second frame section, and a third frame section, where the first frame section is disposed between the second and third frame sections; a hitch member configured to couple to a work machine, the hitch member being coupled to at least one of the first, second, and third frame sections; a first actuator coupled to the first frame section, a second actuator coupled to the second frame section, and a third actuator coupled to the third frame section; a first sensor coupled to the first frame section, the first sensor configured to detect a first height of the first frame section from an underlying surface; a second sensor coupled to the second frame section, the second sensor configured to detect a second height of the second frame section from the underlying surface; a third sensor coupled to the third frame section, the third sensor configured to detect a third height of the third frame section from the underlying surface; a control unit disposed in electrical communication with the first sensor, the second sensor, and the third sensor, the controller operably controlling the first actuator, the second actuator and the third actuator; wherein, the control unit compares the first height, the second height, and the third height to one another and determines if each height is equal to or within a threshold limit of one another; further wherein, when one of the first height, second height or third height is determined not to be equal to or within the threshold limit of the other two heights, the controller determines which frame section is uneven with the other two frame sections and actuates the actuator that is coupled to the uneven frame section until the first height, second height, and third height are equal or within the threshold limit of one another.

In one example of this embodiment, at least one of the first sensor, second sensor, and third sensor is ultrasonic, radar, optical, or laser. In a second example, the implement may include a fluid source for providing hydraulic fluid; a first control valve operably controllable between an open position and a closed position, the first control valve fluidly coupling the fluid source to the first actuator in the open position; a second control valve operably controllable between an open position and a closed position, the second control valve fluidly coupling the fluid source to the second actuator in its open position; a third control valve operably controllable between an open position and a closed position, the third control valve fluidly coupling the fluid source to the third actuator in its open position; and a flow path defined between the fluid source, the first actuator, the second actuator, and the third actuator, the flow path fluidly coupling the first, second and third actuators in parallel with one another.

In a third example, the height of the first frame section is controllably adjusted by the first actuator when the first control valve is in its open position and the second and third control valves are in their closed positions; the height of the second frame section is controllably adjusted by the second actuator when the second control valve is in its open position and the first and third control valves are in their closed positions; and the height of the third frame section is controllably adjusted by the third actuator when the third control valve is in its open position and the first and second control valves are in their closed positions. In a fourth example, the implement may include a fourth sensor, a fifth sensor, and a sixth sensor, the fourth sensor being coupled to the first frame section, the fifth sensor being coupled to the second frame section, and the sixth sensor being coupled to the third frame section. In a fifth example, the first sensor is coupled at a front end of the first frame section and the fourth sensor is coupled at a rear end thereof, the first sensor detecting a front height of the first frame section and the fourth sensor detecting a rear height of the first frame section; the second sensor is coupled at a front end of the second frame section and the fifth sensor is coupled at a rear end thereof, the second sensor detecting a front height of the second frame section and the fifth sensor detecting a rear height of the second frame section; and the third sensor is coupled at a front end of the third frame section and the sixth sensor is coupled at a rear end thereof, the third sensor detecting a front height of the third frame section and the sixth sensor detecting a rear height of the third frame section.

In a further example, the implement may include a linkage pivotably to one of the first, second or third sections of the frame for adjustably controlling a pitch of the frame; and a linkage actuator coupled to the linkage for adjusting a length of the linkage; wherein, if a front height of one of the frame sections is detected not to be equal to or within a threshold limit of the rear height of the respective frame section, the control unit operably actuates the linkage actuator to adjust the length of the linkage until the front height is equal to or within the threshold limit of the rear height. In yet a further example, the implement may include a fluid circuit fluidly coupled to a fluid source, the fluid circuit including a control valve disposed in fluid communication with the linkage actuator; wherein, the control valve is operably controlled to actuate the linkage actuator between a retracted position and an extended position.

In a second embodiment a work implement includes a transversely extending frame including a front end and a rear end; a hitch member configured to couple to a work machine, the hitch member being coupled to the front end of the frame; a front wheel and a rear wheel coupled to and supporting the frame, the front wheel and rear wheel adapted to move along an underlying surface; a front wheel arm coupled to the front wheel and pivotably coupled to the front end of the frame at a first pivot location; a rear wheel arm coupled to the rear wheel and pivotably coupled to the rear end of the frame at a second pivot location; a linkage coupled to the front wheel arm and rear wheel arm, the linkage including a linkage actuator for adjustably controlling a length of the linkage; a first sensor coupled to the frame at or near the first pivot location, the first sensor configured to detect a first height of the frame relative to the underlying surface; a second sensor coupled to the frame at or near the second pivot location, the second sensor configured to detect a second height of the frame relative to the underlying surface; and a control unit disposed in electrical communication with the first sensor and the second sensor, the control unit operably controlling the linkage actuator based on the detected first height and second height.

In a first example of this embodiment, wherein the linkage actuator includes an electric actuator, hydraulic actuator, or electro-hydraulic actuator. In a second example, the control unit compares the first height to the second height, and if the first height is not equal to or within a threshold limit of the second height, the linkage actuator is controllably actuated until the first height is equal to or within the threshold limit of the second height. In a third example, a second actuator coupled to the frame and the rear wheel arm, the second actuator being actuated between a first position and a second position to raise or lower the frame relative to the underlying surface.

In a fourth example, the frame includes a main frame and a sub-frame, the main frame including the first sensor and a first work tool, and the sub-frame including the second sensor and a second work tool; wherein, the linkage adapter is controllably actuated to maintain the main frame and sub-frame level with one another; wherein, the second adapter is controllably actuated to control a depth of the first work tool and second work tool relative to the underlying surface. In a fifth example, the frame includes a main frame, a first sub-frame, and a second sub-frame, the main frame including the first sensor and a first work tool, the first sub-frame including the second sensor and a second work tool, and the second sub-frame including a third sensor and a third work tool; wherein, the linkage adapter is controllably actuated to maintain the main frame, the first sub-assembly and the second sub-assembly level with one another; wherein, the second adapter is controllably actuated to control a depth of the first work tool, the second work tool, and the third work tool relative to the underlying surface.

In a sixth example, the frame includes at least a first frame section, a second frame section, and a third frame section, where the first frame section is disposed between the second and third frame sections; a first actuator coupled to the first frame section, a second actuator coupled to the second frame section, and a third actuator coupled to the third frame section; the first and second sensors coupled to the first frame section, the first sensor configured to detect a height of the front of the first frame section relative to the underlying surface and the second sensor configured to detect a height of the rear of the first frame section relative to the underlying surface; a third and a fourth sensor coupled to the second frame section, the third sensor configured to detect a height of the front of the second frame section relative to the underlying surface and the fourth sensor configured to detect a height of the rear of the second frame section relative to the underlying surface; a fifth and a sixth sensor coupled to the third frame section, the fifth sensor configured to detect a height of the front of the third frame section relative to the underlying surface and the sixth sensor configured to detect a height of the rear of the third frame section relative to the underlying surface; wherein, the control unit compares the heights detected by each sensor and adjustably controls the first actuator, the second actuator and the third actuator until each height is equal to or within a threshold limit of one another.

In another example, each of the first frame section, the second frame section and the third frame section includes the linkage and linkage actuator; further wherein, the control unit operably controls the linkage actuator on each frame section so that the height of the front of each frame section is equal to or within a threshold limit of the height of the rear of the respective frame section. In a further example, each sensor includes a tilt sensor for detecting an angle of the respective frame section relative to the other two frame sections. In yet a further example, the implement includes a fluid circuit fluidly coupled to a fluid source, the fluid circuit including a control valve disposed in fluid communication with the linkage actuator;

wherein, the control valve is operably controlled to actuate the linkage actuator between a retracted position and an extended position.

In another embodiment, a method is provided for levelling an agricultural implement having a transversely extending frame forming a center frame section, a first frame section disposed on one side of the center frame section, and a second frame section disposed on an opposite side of the center frame section, the method including providing a fluid source, a control unit, one or more actuators coupled to each frame section, a plurality of sensors coupled to each frame section, and a plurality of tools coupled to each frame section; detecting a height of the first frame section relative to an underlying surface with a first sensor of the plurality of sensors, a height of the second frame section relative to the underlying surface with a second sensor of the plurality of sensors, and a height of the center frame section relative to the underlying surface with a third sensor of the plurality of sensors; comparing the height of the first frame section, the height of the second frame section, and the height of the center frame section relative to one another by the control unit; and determining an uneven frame section based on the comparing step if the height of one of the frame sections is not equal to or within a threshold limit of the heights of the other two frame sections; wherein, when the height of one of the frame sections is determined not to be equal to or within a threshold limit of the heights of the other two frame sections, the method further includes fluidly coupling the fluid source to a first actuator if the height of the first frame section is uneven with the other two frame sections, to a second actuator if the height of the second frame section is uneven with the other two frame sections, or to a third actuator if the height of the center frame section is uneven with the other two frame sections; actuating the respective actuator corresponding to the uneven frame section until the height of each frame section is equal to or within a threshold limit of one another; and levelling the center frame section, first frame section, and second frame section relative to one another.

In one example of this embodiment, the method includes providing a linkage coupled to each frame section, a linkage actuator coupled to each linkage, and a fourth sensor of the plurality of sensors coupled to a front end of one of the center, first, and second frame sections, wherein the first sensor is coupled to a rear end of the first frame section, the second sensor is coupled to a rear end of the second frame section, and the third sensor is coupled to a rear end of the center frame section; detecting a height of the front end of the respective frame section relative to the underlying surface; comparing the detected height of the front end of the respective frame section with the height of the rear end of the same frame section; and determining if the height of the front end is equal to or within a threshold limit of the height of the rear end of the same frame section; wherein, if the height of the front end is not equal to or within the threshold limit of the height of the rear end, the method further including controllably actuating the linkage actuator of the respective frame section by the control unit; and adjusting a length of the linkage of the respective frame section by the linkage actuator until the height of the front end is equal to or within the threshold limit of the height of the rear end of the respective frame section.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4 is a chart of valve and cylinder primary response for tool depth control;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
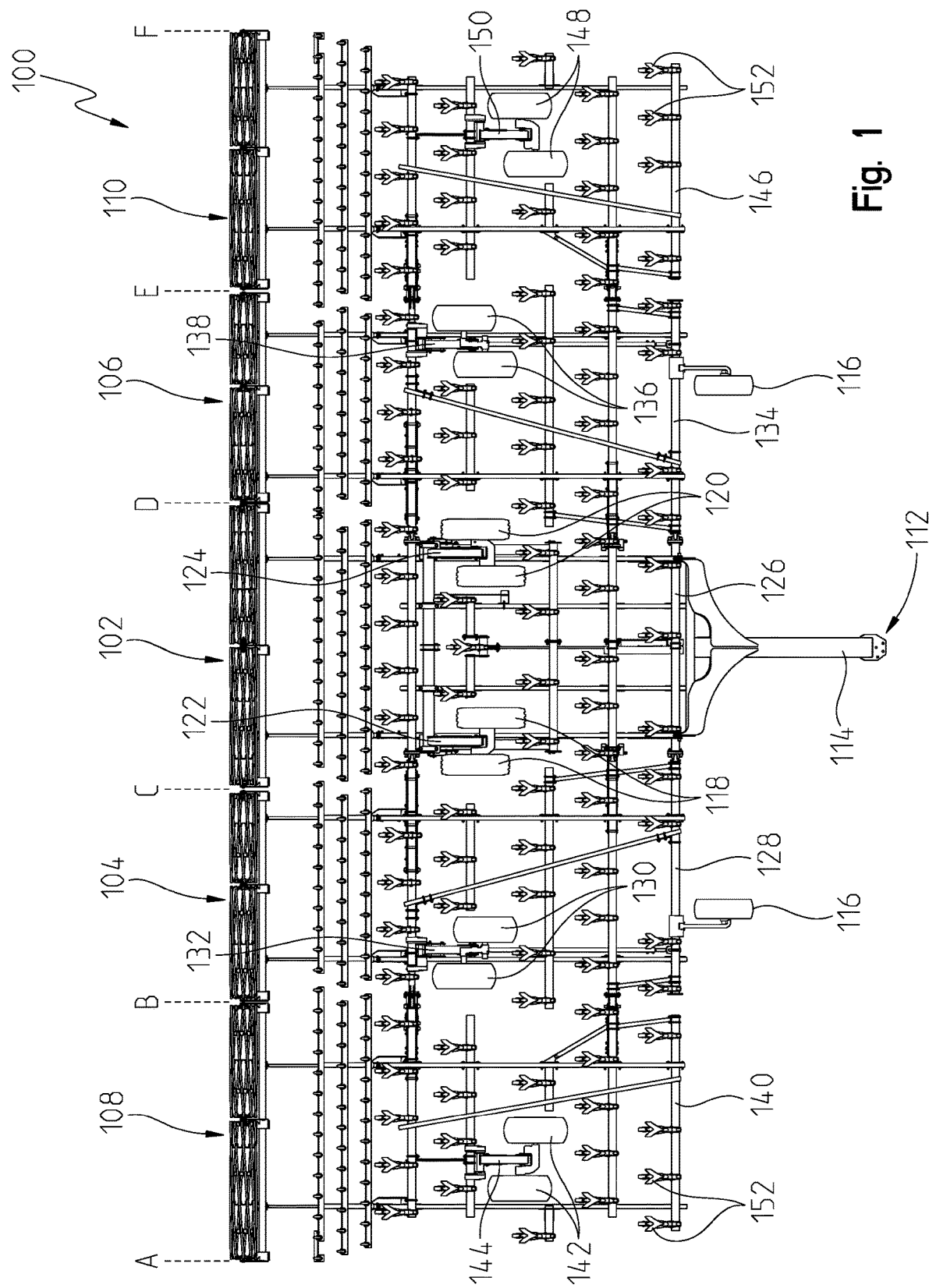
FIG. 1 is an elevated view of one embodiment of an agricultural implement.

Referring to FIG. 1, an agricultural implement 100 such as a field cultivator is shown. The implement 100 is designed to couple to a work machine and perform a work function. For example, the implement may include work tools that penetrate into soil for aerating the soil before planting or uprooting weeds after planting. The implement 100 may be attached to a work machine or tractor (not shown) by a hitch assembly 112 such as a three-point hitch or a drawbar attachment. The hitch assembly 112 includes a hitch frame member 114 that extends longitudinally in a direction of travel for coupling to the work machine or tractor.

The agricultural implement 100 may include a transversely-extending frame that forms multiple frame sections. In FIG. 1, for example, the implement 100 includes a main or center frame 102. The main frame 102 is coupled to the hitch assembly 112 as shown. A first frame section or first inner frame 104 is disposed to one side of the main frame 102, and a second frame section or second inner frame 106 is disposed to an opposite side thereof. In addition, a third frame section or first outer frame 108 is disposed to an outside of the first inner frame 104, and a fourth frame section or second outer frame 110 is disposed to an outside of the second inner frame 106. Each frame section may be pivotably coupled to the frame section adjacent thereto. The first inner frame 104, for example, may be pivotably coupled to the main frame 102 and the first outer frame 108. Similarly, the second inner frame 106 may be pivotably coupled to the main frame 102 and the second outer frame 110.

The implement 100 may be supported by a plurality of wheels. For example, a pair of front wheels 116 are coupled to the frame at a front end thereof. The main frame 102 may be supported by a first pair of wheels 118 and a second pair of wheels 120. The first inner frame 104 may be supported by a third pair of wheels 130 and the second inner frame 106 may be supported by a fourth pair of wheels 136. Likewise, the first outer frame 108 may be supported by a fifth pair of wheels 142 and the second outer frame 110 may be supported by a sixth pair of wheels 148. While each section is shown being supported by a different pair of wheels, this is only shown in the illustrated embodiment. In other embodiments, there may be only a single wheel supporting each frame section. In a different embodiment, there may be more than a pair of wheels supporting each frame section. Moreover, the implement 100 may include more than the front wheels 116. For instance, there may be back wheels disposed near the rear of the implement for additional support.

In the illustrated embodiment of FIG. 1, the agricultural implement 100 may include a plurality of actuators for controlling movement of the frame. Each actuator may be a hydraulic actuator, electric actuator, or any other known actuator. Moreover, each actuator may include an outer body or cylinder in which a rod or piston moves between an extended position and a retracted position. In FIG. 1, the main frame 102 includes a first actuator 122 and a second actuator 124. The first pair of wheels 118 may be coupled to the main frame 102 via a rock shaft (not shown) that may be hydraulically actuated by the first actuator 122. The second pair of wheels 120 may be coupled to the main frame 102 via another rock shaft (not shown) that may be hydraulically actuated by the second actuator 124. The actuators can raise or lower the main frame 102 relative to the wheels 118, 120, as will be described below.

The first inner frame 104 may include an actuator 132 for raising or lowering the first inner frame 104. Similarly, the second inner frame 106 may include an actuator 138 for controlling a raising or lowering movement of the second inner frame 104. The first outer frame 108 may include an actuator 144 and the second outer frame 110 may include an actuator 150. The actuator 144 may control raising and lowering of the first outer frame 108 and the actuator 150 may control raising and lowering of the second outer frame 110.

In FIG. 1, the main frame 102 includes a plurality of main frame members 126. A plurality of tools 152 may be coupled to the main frame members 126 for engaging a ground surface or soil upon which the implement travels. Similarly, the first inner frame 104 includes a plurality of first inner frame members 128, the second inner frame 106 includes a plurality of second inner frame members 134, the first outer frame 108 includes a plurality of first outer frame members 140, and the second outer frame 110 includes a plurality of second outer frame members 146. Each of these frame members may include a plurality of work tools 152 coupled thereto.

While FIG. 1 represents an illustrated embodiment of an agricultural implement with five frame sections, this disclosure is not limited to this embodiment. Other embodiments may include only three sections with a main frame and two outer frames. Alternatively, there may be more than five frame sections in further embodiments. Thus, this disclosure is not limited to any number of frame sections, and the teachings herein may be applicable to any multi-section implement.

Figure 2:
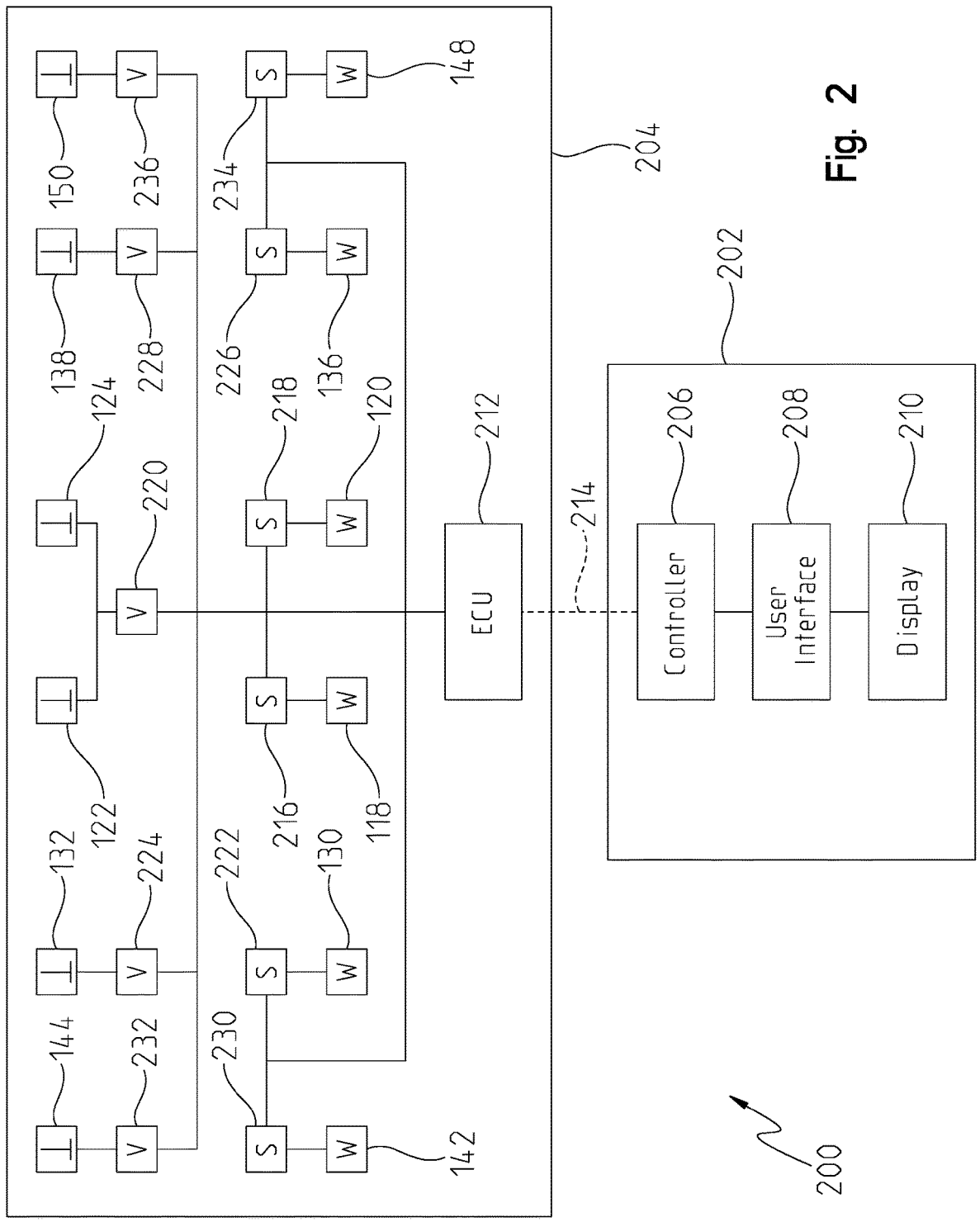
FIG. 2 is a diagram of an electronic control system of a work machine and the agricultural implement of FIG. 1.

Referring to FIG. 2, an electronic control system 200 is shown of an agricultural implement 204 similar to the one described above and shown in FIG. 1. Where applicable, reference numbers are repeated in FIG. 2 as first addressed above with reference to FIG. 1. In FIG. 2, a work machine 202 and the implement 204 are shown. The work machine 202 may include a frame or chassis supported by a plurality of ground-engaging mechanisms (not shown) such as wheels. An operator's cab (not shown) may be mounted to the frame and an operator may control the work machine 202 therefrom. To do so, the work machine 202 may include a plurality of controls (not shown) such as joysticks, levers, switches, knobs, a steering wheel, pedals, and the like. A controller 206 may be electrically coupled to the plurality of controls, and the controller 206 may control the functionality of the work machine 202.

Moreover, a user interface 208 may be disposed in the operator's cab. The user interface 208 may include a display 210 for displaying various characteristics of the work machine such as, but not limited to, speed, fluid temperatures, fluid pressures, direction of travel, etc. The display 210 may be a touchscreen display that allows the operator to control certain functions of the machine 202 by touching a button on the display 210. Other uses of the user interface are available and this disclosure is not intended to be limited in any way with respect to the functionality of the operator controls or user interface 208.

The user interface 208 may also include controls for controlling the implement 204, such as movement of the frame or setting a tool depth. For example, the operator may desire to raise or lower the main frame 102 of the implement. To do so, the operator may input an instruction through the user display 208 which is received by the controller 206. The controller 206 may communicate with an electronic control unit (ECU) 212 of the implement 204 via a wireless or control area network (CAN) 214. A CAN is a vehicle bus standard designed to allow microcomputers and other electronic devices to communicate electronically with each other in applications without a host computer. Here, the machine controller 206 may send an instruction to the implement ECU 212 to raise or lower the main frame 102. As will be described, the ECU 212 may be programmed to execute this instruction and raise or lower the main frame 102 or any other frame section of the implement.

Referring to FIGS. 1 and 2, the ECU 212 may be in electrical communication with a plurality of sensors (e.g., rotary, Hall Effect) that are disposed at various locations on the implement 204. For instance, a first sensor 216 may be disposed at a location on the main frame 102 for detecting rotation of the rock shaft (not shown) which is connected to the first pair of wheels 118. A second sensor 218 may be disposed at a location on the main frame 102 for detecting rotation of the rock shaft connected to the second pair of wheels 120. Each sensor may be a rotary sensor, a Hall Effect sensor, or any other type of sensor. In addition, the first and second sensors may detect rotation of the rock shafts and communicate accordingly to the ECU 212. The ECU in turn can adjust or set the height of the main frame 102.

For example, a height of the wheels can be used to set a frame height. As described above, a plurality of ground-engaging work tools 152 may be coupled to the main frame 102. By controlling or actuating the first actuator 122 and the second actuator 124, the height of the main frame 102 can change for setting a depth of the work tools 152 into a ground surface or soil upon which the implement 100 travels. The first sensor 216 and the second sensor 218 may be positioned appropriately to detect rotation of the rock shaft. As the rock shaft rotates, the actuator extends or retracts. The ECU 212 may be programmed such that when the first actuator 122 and second actuator 124 are fully extended the main frame height is at a first height, and when the actuators are fully retracted the main frame height is at a second height. As the actuator cylinders extend and retract, the first pair of wheels 118 and second pair of wheels 120 can be raised or lowered, thereby adjusting the height of the main frame 102.

Besides the sensors on the main frame, a third sensor 222 may be disposed on the first inner frame 104 and detect a height of the third pair of wheels 130. A fourth sensor 226 may be disposed on or near the second inner frame 106 for detecting a height of the fourth pair of wheels 136. A fifth sensor 230 may be disposed on or near the first outer frame 108 for detecting a height of the fifth pair of wheels 142. Likewise, a sixth sensor 234 may be disposed on or near the second outer frame 110 for detecting a height of the sixth pair of wheels 148. Each of the third, fourth, fifth, and sixth sensors may be in electrical communication with the ECU 212. Moreover, while six different sensors are shown in FIG. 2, the present disclosure is not limited to six sensors. Other embodiments may include additional sensors for detecting and setting frame height. For those embodiments with fewer frame sections, there may be fewer sensors. Each sensor detects a position of wheels on each frame section, and thus the number of sensors may depend on the number of frame sections of a multi-section implement.

Figure 3:
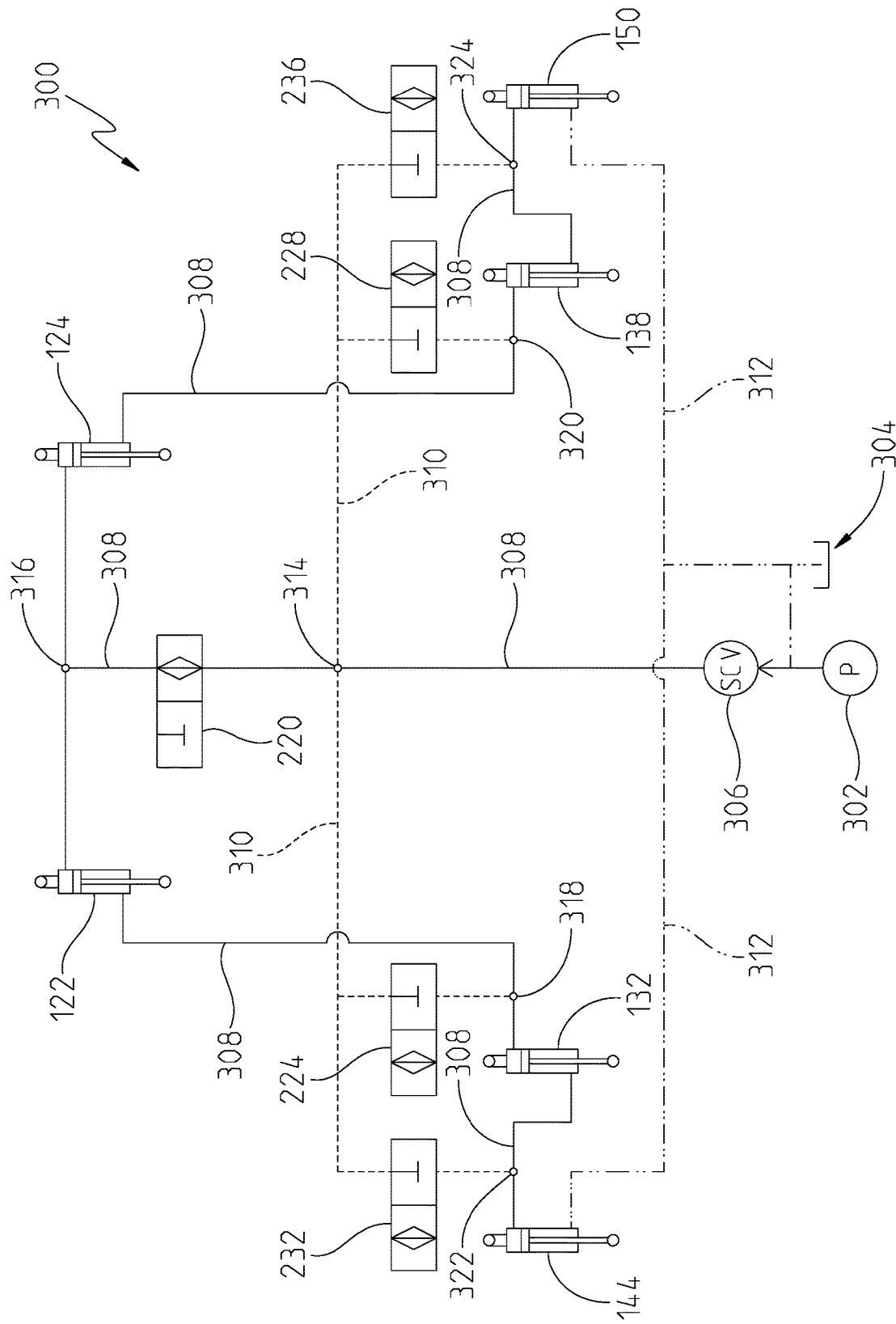
FIG. 3 is a diagram of a hydraulic control system of the work machine and agricultural implement of FIG. 2.

Referring to FIGS. 2 and 3, the implement 204 may also include a plurality of control valves for controlling movement of the overall frame and each independent frame section. As shown, a first control valve 220 may be in electrical communication with the ECU 212. The first control valve 220 may be used for adjusting the height of the overall frame or only the main frame 102. A second control valve 224 may be in electrical communication with the ECU 212 for controlling a raising or lowering movement of the first inner frame 104. A third control valve 228 may be in electrical communication with the ECU 212 for controlling a raising or lowering movement of the second inner frame 106. A fourth control valve 232 may be in electrical communication with the ECU 212 for controlling a raising or lowering movement of the first outer frame 108. Moreover, a fifth control valve 236 may be in electrical communication with the ECU 212 for controlling a raising or lowering movement of the second outer frame 110.

Each of the aforementioned control valves may be an electrohydraulic control valve that is capable of moving between an open position and a closed position. Each valve may include a solenoid (not shown) that is energized by an electrical current or signal sent by the ECU 212 to induce movement of the valve between the open and closed positions. The movement of the control valves can adjust fluid flow to the different actuators for controlling movement of the overall frame or each individual frame section, as will be described below.

Among other things, the present disclosure provides details of a hydraulic control system for achieving depth control of work tools and controlling movement of a multi-section frame of an agricultural implement. With multi-section frame implements such as the one shown in FIG. 1, it is desirable to achieve uniform tool depth along each section. Each section may have different tolerances or there may be a small leak in the actuator that controls movement of an individual frame section. In either case, it can be difficult to achieve uniform depth across each frame section and therefore the implement can utilize its hydraulic control system (and other control systems) to monitor and maintain uniform depth control.

In conventional hydraulic control systems, the two most common types of depth control systems are series hydraulic control and parallel hydraulic control. A series hydraulic control is typically a pure mechanical system without any electronic control. Here, hydraulic fluid is supplied from a fluid source to a first or master actuator or cylinder. The master cylinder receives the full amount of fluid flow, and as the master cylinder is actuated, fluid is displaced from the master cylinder and flows to the next-in-line actuator or cylinder. In this system, each actuator or cylinder is fluidly connected to one another in a series which allows for each cylinder to quickly receive fluid from the fluid source.

The series hydraulic control is ideal when it is necessary to raise the entire implement frame. However, it is not as desirable when only one frame section needs to be raised or lowered. As a result, some implements utilize the parallel hydraulic control. The parallel hydraulic control can include electronic control unlike the series hydraulic control. In this type of control, valves are utilized to control how fluid flows through the system. Fluid flows across each section in an equal amount so that fluid is available at each wheel to adjust a frame section height. The fluid source, however, only has a limited amount of fluid. Thus, when an operator wants to raise or lower a certain frame section, the parallel hydraulic control is capable of providing fluid to the actuator at that section but it may take much longer than in a series hydraulic control. It therefore can take longer to raise or lower a frame section, which can delay the operator from performing a desired function or operation. A slower system response is often the result with a depth control system consisting of conventional parallel hydraulic control.

Referring to FIG. 3, the present disclosure provides a different type of depth control system for the implement 204. Here, a combination of the series hydraulic control and parallel hydraulic control form a hybrid parallel-series hydraulic depth control system 300. In this system 300, additional hydraulics is added to obtain the benefits of both the series and parallel control while eliminating or reducing the problems associated with each. In FIG. 3, a fluid source 302 provides hydraulic fluid to the system 300. The fluid source 302 may be located on the work machine or tractor 202, and a hydraulic pump may supply the fluid to the implement. A fluid reservoir or tank 304 may also be provided for fluid to return from the implement 204. The fluid source 302 and fluid reservoir 304 may be fluidly coupled to one another.

The work machine or tractor 202 may also include a selective control valve 306 that is fluidly coupled to the fluid source 302. The valve 306 may be any type of valve that selectively allows fluid to flow from the work machine 202 to the implement 204. The valve 306 may be an electrohydraulic control valve that is controlled by the machine controller 206. For example, the controller 206 may be programmed to selectively open and close the control valve 206. If the work machine 202 requires additional hydraulic fluid to perform an operation, the controller 206 may close the valve 306 and not permit fluid to flow to the implement 204. In one embodiment, the selective control valve 306 may be biased to its open position and thus may be referred to as a normally open control valve. In another embodiment, the valve 306 may be biased to its closed position and thus be referred to as a normally closed valve.

In any event, hydraulic fluid may be supplied by the fluid source 302 through the control valve 306 and to the implement 204 via a first flow path 308 or pressure line. The first flow path 308 may be defined such that is passes through the first control valve 220 and to each of the first actuator 122 and second actuator 124. Moreover, when the first or second actuator is actuated, fluid displacement may result in fluid flowing through the first flow path to either the third actuator 132 or fourth actuator 138. Similarly, when either the third or fourth actuator are actuated, the fluid displacement in the actuator may allow fluid to flow to the fifth actuator 144 or sixth actuator 150 via the first flow path 308. In this embodiment, the first flow path 308 forms a series hydraulic control in which each actuator is fluidly coupled to one another in series. This can allow an operator to raise or lower the entire frame of the implement 204, or raise or lower the main frame 102.

In the first fluid path 308 or pressure line, the first control valve 220 may be biased in its open position. In this embodiment, the first control valve 220 is a normally open electrohydraulic control valve and thus hydraulic fluid can flow via the first fluid path 308 through the first control valve 220 without requiring any interaction by the ECU 212. This again is similar to the series hydraulic control described above. In this disclosure, however, it is appreciated that in other embodiments, the first control valve 220 may be a normally closed electrohydraulic control valve. In these other embodiments therefore the ECU 212 may be required to actuate or trigger the valve to its open position. In a further embodiment, the first control valve 220 may not be controlled by the ECU 212 or biased in either an open or closed position, but rather pressure acting on either side of the valve may actuate it between an open and closed position. Thus, different types of valves may be used in the embodiments described herein.

To control depth of the plurality of work tools 152, a second fluid path 310 or pressure line may be provided. A node 314 may be provided where the first and second fluid paths intersect. The node 314 may be a manifold or T that allows fluid to flow through both lines. Thus, fluid can flow from the fluid source 302 through the first fluid path 308 and the second fluid path 310. As shown in FIG. 3, however, the second control valve 224, the third control valve 228, the fourth control valve 232, and the fifth control valve 236 may be biased in their closed positions. Thus, fluid flowing through the second flow path is unable to flow through these other control valves until the ECU 212 selectively opens one of the control valves. If the ECU 212 selectively opens the second control valve 224, for example, then fluid can flow through the valve 224 via the second flow path 310 and reach the third actuator 132. In doing so, the third actuator 132 may be controllably actuated to raise or lower the first inner frame 104 to adjust the depth of its plurality of work tools 152.

Similar to the first control valve 220 described above, this disclosure is not intended to limit the different control valves to any particular biased position. Thus, the second control valve 224, the third control valve 228, the fourth control valve 232, and the fifth control valve 236 may be biased or pre-disposed in a normally open position or a normally closed position. Alternatively, these control valves may be actuated by fluid pressure acting on either side of each respective valve, thereby not requiring intervention by the ECU 212. Other embodiments that incorporate any type of valve may be used to achieve the operation of the control system 300.

The control system 300 may also include a third fluid path 312 or return pressure line. Each actuator may be designed to include at least two different fluid ports. One port may be disposed on a base side of the actuator and the other port may be disposed on a rod side of the actuator. The third fluid path 312 is fluidly coupled to the fluid reservoir 304, the fifth actuator 144, and the sixth actuator 150. Any fluid that flows through the first and second flow paths can therefore be returned to the reservoir 304 via the third flow path 312. As a result, a combination of the first and third flow paths and the second and third flow paths can define a closed-loop hydraulic circuit.

As previously described, the first control valve 220 does not require any electronic intervention or control by the ECU 212 to permit fluid flow through the series portion of the system 300. On the other hand, the second control valve 224, the third control valve 228, the fourth control valve 232, and the fifth control valve 236 are electrically controlled by the ECU 212 to permit fluid flow through the parallel portion of the system 300. When an operator commands a raising or lowering movement of an individual frame section, the ECU 212 may command the first control valve 220 to its closed position and open one of the normally-closed valves to allow fluid flow through the second flow path 310 to the appropriate actuator for raising or lowering the desired frame section. This type of control will be described with reference to FIGS. 4 and 5.

Figure 5:
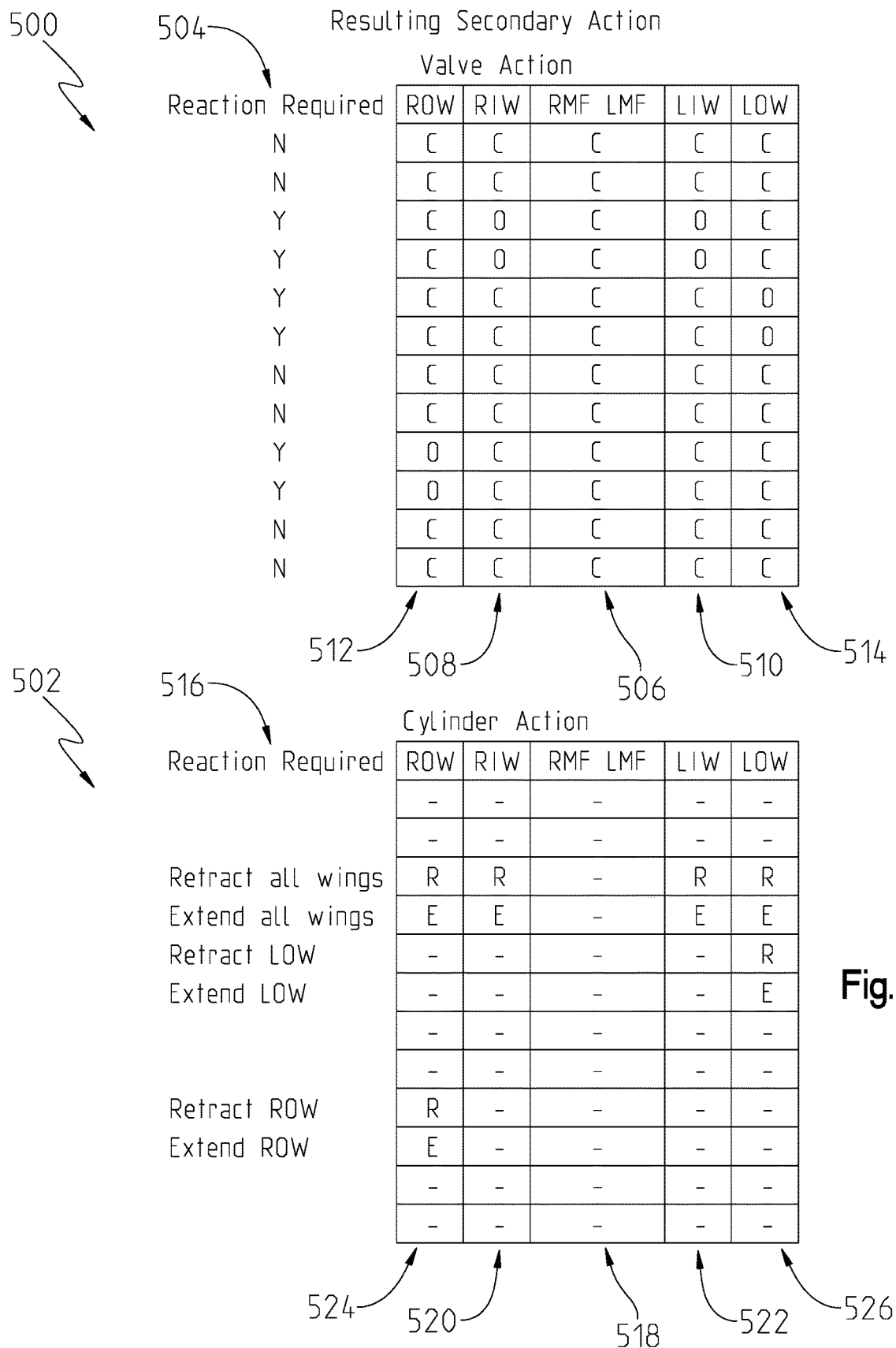
FIG. 5 is a chart of valve and cylinder secondary response for tool depth control.

Before turning to FIGS. 4 and 5, however, the hydraulic control system 300 of FIG. 3 includes a plurality of nodes or manifolds. As previously described, the first node 314 is an intersection point of the first and second flow paths. A second node 316 may be disposed in the first fluid path 308 downstream of the first control valve 220. Here, the first flow path 308 separates into two flow paths so that fluid can be supplied to the first actuator 122 along one path and the second actuator 124 along a second path.

A third node 318 is another intersection point of the first and second flow paths, but it is located downstream of the second control valve 224. Here, fluid may pass through the third node 318 and to the third actuator 132. A fourth node 320 is an intersection point of the first and second fluid paths, but it is located downstream of the third control valve 228 and upstream from the fourth actuator 138. A fifth node 322 is another intersection point of the first and second flow paths, but it is located downstream of the fourth control valve 232 and upstream from the fifth actuator 144. Lastly, a sixth node 324 provides a further intersection point of the first and second flow paths, but it is located downstream from the fifth control valve 236 and upstream of the sixth actuator 150. In the illustrated embodiment, each of the third, fourth, fifth and sixth nodes are located between a different control valve and a different actuator. Unlike the first and second nodes, however, fluid may only flow through either the first or second flow path when passing through each of the third, fourth, fifth and sixth nodes due to the ECU selectively opening or closing the different control valves.

Referring to FIG. 4, control logic for controlling the implement is provided. Here, the logic includes a primary control valve response table 400 and a primary actuator or cylinder response table 402. In the valve response table 400, there are rows that refer to a type of response commanded by an operator such as raise or lower the overall implement frame (e.g., "Raise Overall"), raise or lower the main frame 102 (e.g., "Raise MF"), raise or lower the first inner frame 104 (e.g., "Raise LIW"), raise or lower the second inner frame 106 (e.g., "Raise RIW"), raise or lower the first outer frame 108 (e.g., "Raise LOW"), and raise or lower the second outer frame 110 (e.g., "Raise ROW"). In this table, "R" refers to right and "L" refers to left when looking at the implement from its front rearward. Moreover, "I" refers to inner and "O" refers to outer.

The other rows in the valve response table 400 indicate the different frame sections of the implement. Here, "RMF" and "LMF" refer to right main frame and left main frame, respectively. In FIG. 1, this is simply the main frame 102. "LIW" and "RIW" refer to left inner wing and right inner wing, respectively. The left inner wing is the first inner frame 104 and the right inner wing is the second inner frame 106 as shown in FIG. 1. Further, "LOW" and "ROW" refer to left outer wing and right outer wing, respectively, which corresponds with the first outer frame 108 and the second outer frame 110, respectively. In this table 400, the response of each control valve is illustrated as either being in its open position "O" or closed position "C".

For purposes of table 400, the first control valve 220 has a response indicated with reference number 404, the second control valve 224 has a response indicated as reference number 408, the third control valve 228 has a response indicated as reference number 406, the fourth control valve 232 has a response indicated as reference number 412, and the fifth control valve 236 has a response indicated as reference number 410.

In the primary actuator or cylinder table 402, the rows and columns are similar to those in table 400. Here, however, the actuator is being characterized as either being in its extended position "E" or its retracted position "R". In the event the actuator is not actuated, then neither an "E" or an "R" appears in the respective box. The response of the first and second actuators is represented by reference number 414. The response of the third actuator 132 is represented by reference number 418, the response of the fourth actuator 138 is represented by reference number 416, the response of the fifth actuator 144 is represented by reference number 422, and the response of the sixth actuator 150 is represented by reference number 420 in FIG. 4.

Referring to FIG. 5, the control logic for controlling the implement may also include a secondary control valve response table 500 and a secondary actuator or cylinder response table 502. In the secondary valve response table 500, a first column 504 provides for different responses or reactions required of the different control valves. Here, if a secondary response is required, the column 504 illustrates a "Y", and if no secondary response is required then the column 504 is shown with a "N". This will be further described below.

For purposes of table 500, the first control valve 220 has a response indicated with reference number 506, the second control valve 224 has a response indicated as reference number 510, the third control valve 228 has a response indicated as reference number 508, the fourth control valve 232 has a response indicated as reference number 514, and the fifth control valve 236 has a response indicated as reference number 512.

In the secondary actuator or cylinder table 502, the rows and columns are similar to those in table 500. A first column 516 provides for different responses or reactions required of the different actuators or cylinders. If no response is required, then the row is left blank under column 516. If, however, a response is required, then the type of response is provided. As is similar to table 402, each actuator is being characterized as either being in its extended position "E" or its retracted position "R" in table 502. In the event the actuator is not actuated, then neither an "E" or an "R" appears in the respective box. The response of the first and second actuators is represented by reference number 518. The response of the third actuator 132 is represented by reference number 522, the response of the fourth actuator 138 is represented by reference number 520, the response of the fifth actuator 144 is represented by reference number 526, and the response of the sixth actuator 150 is represented by reference number 524 in FIG. 5.

Since the hydraulic control system 300 of FIG. 3 is a hybrid parallel-series control, hydraulic fluid flows through the system 300 from the innermost frame section (e.g., the main frame 102) to the outermost frame section (e.g., the first outer frame 108 or the second outer frame 110). Since the third flow path or return line 312 is only fluidly coupled to the first and second outer frames, the fluid can flow through the first flow path 308 or second flow path 310 until it works its way into the return line 312 and returns to the fluid reservoir 304. As will be described, the control system 300 may require two responses when independently actuating the third or fourth actuator and raising or lowering either the first inner or second inner frame. This is because as fluid is provided to the third actuator 132, for example, to raise or lower the first inner frame 104, the resulting raising or lowering movement of the first inner frame 104 induces a similar raising or lowering movement of the first outer frame 108 as well. Fluid that is used to actuate the third actuator 132 then flows to the fifth actuator 144, and the fifth actuator 144 is actuated to allow the fluid to be returned to the fluid reservoir via the third fluid path 312. Controlling the fifth actuator 144 therefore results in a secondary action or response to enable the entire frame to be balanced out and controlled at approximately the same height (or same tool depth).

The ECU 212 may have the control logic of FIGS. 4 and 5 stored in a memory unit thereof. A processor of the ECU 212 may then execute the control logic as commanded by the operator. This logic may also be part of a software program or algorithm used by the ECU 212 when controlling the frame height of the implement.

As described above, when the operator desires to raise or lower the entire frame or only the main frame 102, then there is no interaction by the ECU 212 to control the control valves. This is the case when the first control valve 220 is normally or biased in its open position, and the other control valves are biased in their normally closed position. If, however, in a different embodiment the first control valve 220 is a normally closed valve, then the ECU 212 would intervene and electronically control the valve 220 to its open position.

In the primary valve table 400 of FIG. 4, it is shown that a command to raise or lower the entire frame requires the first control valve response 404 to be open "O" and the other control valves to be closed "C". The same is true if the ECU 212 receives an instruction to raise or lower the main frame 102. Again, the first control valve response 404 is to be open and the other control valve responses are closed. Moreover, with respect to the cylinder response table 402, whenever the entire frame or a frame section is controlled in a raised movement, the respective actuator or actuators are controlled to their extended position, and if a lowering instruction is received then the actuator or actuators are controlled to their retracted positions. This is clearly shown in table 402 of FIG. 4 where the responses of all six actuators is to extend when raising the entire frame and all six actuators retract when lowering the entire frame.

The same is true whenever a single frame section is raised or lowered. For example, when the first outer frame 108 is raised, the corresponding actuator response 422 is to extend. As shown in table 402, when the first outer frame 108 is lowered, the corresponding actuator response 422 is to retract.

Example 1

In a first example of the present disclosure, the operator sets a target depth for the plurality of tools coupled to each frame section of the implement to 3 inches. During operation, the first sensor 216 and second sensor 218 detect the main frame 102 is at a depth of 3.5 inches. Upon communicating this to the ECU 212, the ECU 212 may compare the detected depth to the target depth. In some instances, a threshold may be established such that the detected depth has to be greater than a threshold amount different from the target depth before the ECU 212 takes any corrective action. For this example, suppose the threshold is 0.25 inches and thus the detected depth of 3.5 inches exceeds the threshold amount.

In order to adjust the main frame 102 and raise it from 3.5 inches to the target depth of 3.0 inches, the ECU 212 may be programmed based on the logic of FIGS. 4 and 5. Here, in table 400 the first control valve 220 needs to be in its open position and the other control valves in their closed position. As described above, the first control valve 220 is normally open and the other control valves are normally closed. Thus, there is no required action on behalf of the ECU 212 other than monitor the first and second sensors until the first actuator 122 and second actuator 124 are actuated to their extended positions to raise the main frame 102. As shown in table 402, the other actuators are also actuated to their extended positions when raising the main frame 102.

Once the main frame 102 is raised to the target depth of 3 inches, the ECU 212 receives communications from the other sensors indicating that both inner frames and both outer frames have also been raised by 0.5 inches to 2.5 inches. Thus, corrective action is required. This is further shown in FIG. 5 in column 504 where it indicates a corrective response is required. According to table 502, the corrective response is to close the first control valve 220. In addition, the second control valve 224 and third control valve 228 may be opened to allow the third actuator 132 and fourth actuator 138 to be actuated to lower the first and second inner frames. As described above, with the parallel hydraulic control, by lowering the first inner frame 104 a resulting action is the first outer frame 108 also lowers by approximately the same amount. Moreover, by lowering the second inner frame 106, the second outer frame 110 also lowers by approximately the same amount. Thus, each frame section is operably controlled to the target depth.

Example 2

In a second example, the operator may set the target depth to 3 inches again. During operation, the ECU receives a signal from the fifth sensor 230 indicating that the first outer frame 108 is detected at 2.5 inches deep. If the threshold is 0.25 inches, the detected depth exceeds the threshold and is not at the target depth. Thus, the ECU 212 can operably control the hydraulic fluid from the fluid source 302 through the second flow path 310 and to the fourth control valve 232. Moreover, based on table 402, to lower the first outer frame 108 the appropriate valve response 412 is close the first control valve, maintain the second control valve 224, the third control valve 228, and the fifth control valve 236 in their closed positions, and open the fourth control valve 232. According to table 402, the fifth actuator 144 is actuated to its retracted position to operably control a lowering movement of the first outer frame 108 to the target depth. Once the first outer frame 108 reaches the target depth, the hydraulic fluid can return via the third flow path 312 to the fluid reservoir 304. In addition, as shown in tables 500 and 502, there is no secondary corrective action required. In this example, each of the five frame sections should be set at the target depth.

Example 3

In a third example, the operator commands a target depth of 3 inches with a threshold amount of 0.25 inches. In this example, suppose the ECU receives a signal from the fourth sensor 226 indicating that the first inner frame 106 is at a depth of 3.5 inches. Since the detected depth is not at the target depth of 3 inches, and it is outside of the threshold range of 0.25 inches, the ECU 212 can execute the logic set forth in tables 400, 402, 500, and 502 to raise the second inner frame 106 by 0.5 inches.

According to table 400, to raise the second inner frame 106 requires a primary valve response 406 of closing the first control valve 220, opening the third control valve 228, and maintaining the other control valves in their closed positions. By doing so, hydraulic fluid cannot flow through the first control valve 220 via the first flow path, and instead flows through the second flow path 310. Fluid passes through the third control valve 228 and the fourth actuator 138 may be actuated to its extended position as shown in table 402.

As the second inner frame 106 is raised to the target depth of 3 inches, table 502 indicates a secondary corrective action is necessary. In this case, by raising the second inner frame 106 by 0.5 inches, the second outer frame 110 is also raised by 0.5 inches to 3.5 inches. Again, this detected depth is not the target depth and exceeds the threshold range of 0.25 inches. As such, the ECU 212 takes corrective action to lower the second outer frame 110. As shown in table 500, the corresponding response is to maintain the first control valve 220, the second control valve 224, and the fourth control valve 232 in their closed positions. In addition, the ECU 212 operably controls the third control valve 228 from its open position to its closed position, and operably controls the fifth control valve 236 from its closed position to its open position. This allows fluid to flow through the fifth control valve 236 and to the sixth actuator 150. The sixth actuator can be actuated to lower the second outer frame 110 to the target depth of 3 inches, and fluid can be returned to the fluid reservoir 304 via the third fluid path 312.

The above examples are provided only to illustrate how the ECU 212 may be programmed to control the different control valves and actuators for moving the entire frame and each frame section as commanded by the operator. It should be appreciated that in other embodiments, and as described above, one or more of the control valves may be biased in a different position than as shown and described above. As such, the ECU 212 may be programmed accordingly to raise or lower the frame or frame sections utilizing the parallel-series hydraulic control system as described herein.

Figure 6:
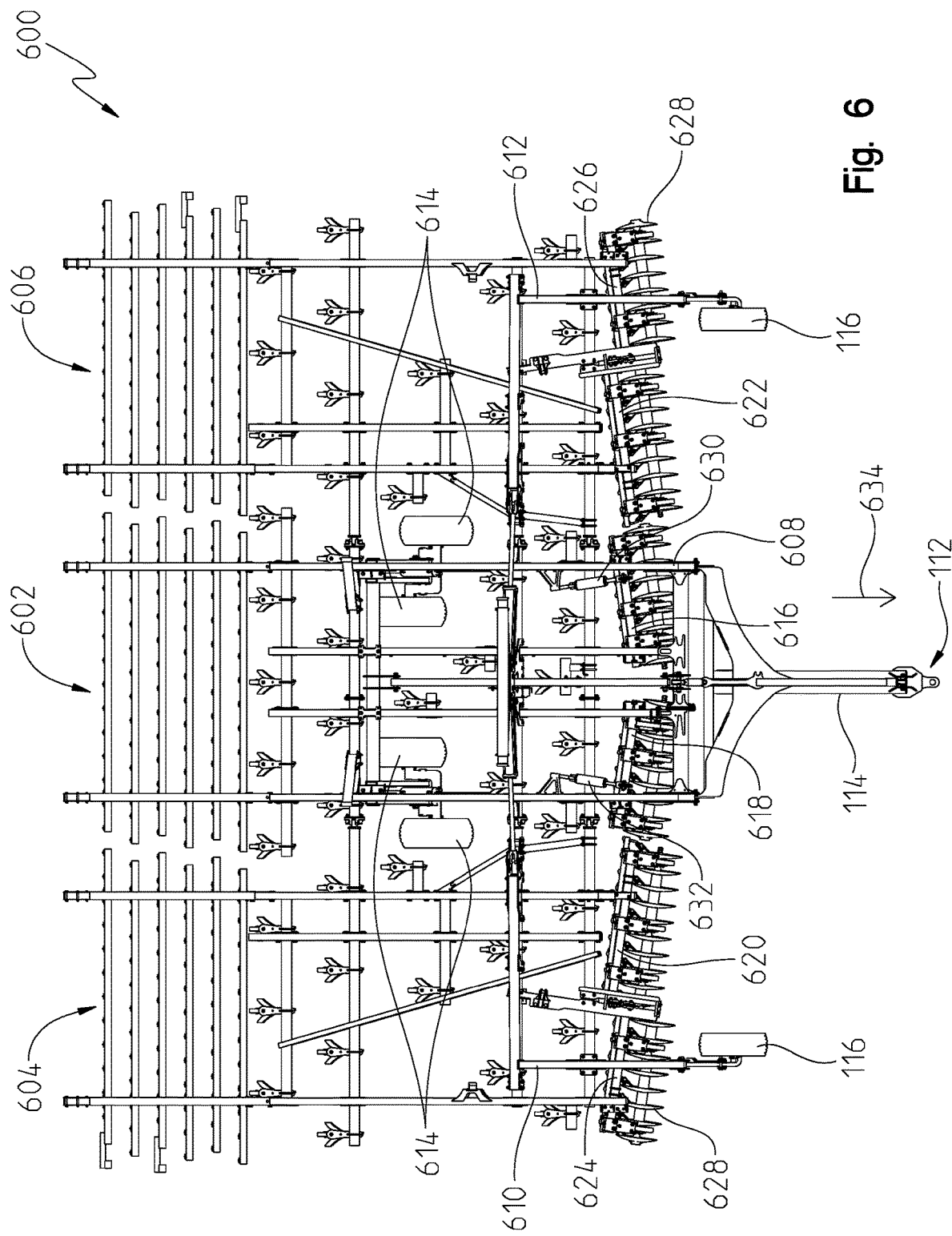
FIG. 6 is an elevated view of another embodiment of an agricultural implement.

Referring to FIG. 6, a different embodiment of an agricultural implement 600 is shown. In this embodiment, reference numbers previously described above and shown in FIGS. 1-5 refer to the same features in FIG. 6. This implement 600 is capable of performing a cultivating operation, although the use or function of the implement is not limiting to this embodiment. The implement is shown being formed by a multiple sections or frame. For instance, a first or centrally located frame 602 is positioned towards the middle of the implement 600. A second frame 604 and a third frame 606 are disposed on opposite sides of the main frame 602. Although only three frame sections are shown in FIG. 6, other embodiments may include more than three sections. Alternatively, one or two frame sections are also possible.

Similar to the previously described embodiments, the first frame section 602 includes one or more frame members 608 that form the entire section 602. Likewise, the second frame section 604 includes one or more frame members 610, and the third frame section 606 includes one or more frame 612. In at least one embodiment, front wheels 116 and rear wheels 614 may be coupled to the frame members.

In the embodiment of FIG. 6, work tools 628 are provided for performing a work function (e.g., the cultivating operation). For purposes of this disclosure, any type of work tool may be used for performing a desired function. In this embodiment, there are a plurality of tools 628 provided for performing the work function. In a different embodiment, there may only be one work tool depending upon the type of work function being executed. Here, the plurality of work tools 628 are coupled to a sub-frame, and the sub-frame is coupled to one of the frame members of either the first frame 602, the second frame 604, or the third frame 606.

In FIG. 6, a first sub-frame 616, a second sub-frame 618, a third sub-frame 620, a fourth sub-frame 620, a fifth sub-frame 620, and a sixth sub-frame 620 are shown. There may be any number of sub-frames in other embodiments. Moreover, each sub-frame may be coupled at a location below the main frame. For purposes of this embodiment, the first frame section 602, the second frame section 604, and the third frame section 606 may be collectively referred to as a main frame. Thus, the plurality of tools 628 are coupled to one of the sub-frames beneath the main frame.

Each sub-frame may be pivotally coupled to the main frame via an actuator. As such, the respective sub-frame may be pivoted with respect to the main frame. In FIG. 6, the first sub-frame 616 is pivotally controlled and coupled to the first frame section 602 by a first actuator 630. Similarly, the second sub-frame 618 may be pivotally controlled and coupled to the first frame section 602 by a second actuator 630. Although not shown, the third sub-frame 620 and fifth sub-frame 624 may each be coupled by an independent actuator to the second frame section 604. Similarly, and also not shown, the fourth sub-frame 622 and the sixth sub-frame 626 may each be coupled by an independent actuator to the third frame section 606.

Each of the aforementioned actuators may be a hydraulic actuator that functions similarly to those described above and shown in FIGS. 1-3. Alternatively, other types of actuators may be used such as electric actuators, mechanical actuators, and any other known type of actuator. In the embodiment of FIG. 6, each actuator is a hydraulic actuator controlled by hydraulic fluid. Moreover, each actuator includes a cylinder (not shown) having a first end coupled to the main frame (e.g., the respective frame section 602, 604, 606) with a rod (not shown) or other member that telescopically moves with respect to the cylinder based on hydraulic pressure within the cylinder. The rod or other member may be coupled to the respective sub-frame to allow pivotal movement of the sub-frame with respect to the main frame. The sub-frame can pivot with respect to the main frame as the actuator is controlled between its extended and retracted positions.

As the sub-frame pivots with respect to the main frame, the angle of each of the plurality of tools 628 coupled to the sub-frame changes with respect to a direction of travel identified by arrow 634 in FIG. 6. The implement 600 may be driven along the direction of travel 634 by a machine or tractor, as described above. In one example, the angle of each tool 628 may be changed by 60° or less. In another example, the angle may be changed by 30° or less. In a further example, the angle may be changed by 10° or less with respect to the direction of travel 634. In yet a further example, the angle of each tool 628 may be varied between 0-10° with respect to the direction of travel 634. Other angles of variation are further contemplated in this disclosure, and may depend on the type of implement, tool, or work function.

The variable angle setting of each sub-frame may be controlled by the ECU 212. This may be controlled hydraulically according to the embodiment shown in FIG. 3. Here, each sub-frame may be coupled to the main frame (e.g., the first frame section 602, the second frame section 604, and third frame section 606) via an actuator. Hydraulic fluid can be controlled to the different actuators in either a series or parallel control. Thus, the variable angle control setting is handled in a manner similar to the depth control setting as previously described.

For sake of clarity, fluid flow may be directed to a control valve similar to that of the first control valve 220. If the ECU 212 controls the control valve to its open position, hydraulic fluid can flow in a series path to each actuator for adjusting the angle of each sub-frame relative to the main frame. If, however, the ECU 212 only wants to control the angle setting of one sub-frame, the ECU 212 may close the control valve and open a different control similar to the other control valves (224, 228, 232, 236) described above. As such, a parallel flow path is formed to enable hydraulic fluid to flow to the actuator that controls pivotal movement of the desired sub-frame. A secondary corrective action, similar to that described in Example 3 above, may also be required and achieved according to the same teachings and principles above. In addition, any of the control valves in this embodiment may be normally open or closed, and the same principles apply for achieving series-parallel hydraulic control of the implement.

Thus, the angle of any one sub-frame may be hydraulically controlled via parallel control to a desired setting with respect to the direction of travel 634. Moreover, all of the sub-frames can be angularly varied with respect to the main frame via series control, as described above.

In a further embodiment, the depth in which a tool or plurality of tools 628 coupled to a sub-frame may be controllably varied with respect to a ground surface. In this embodiment, the sub-frame may be coupled to a rock shaft that rotates or pivots in a substantially vertical direction. The rock shaft may also be coupled to one end of an actuator, whereas the opposite end of the actuator is coupled to the main frame. In this embodiment, the cylinder of the actuator is coupled to the main frame, and the cylinder rod is coupled to the rock shaft. As the cylinder rod extends and retracts with respect to the cylinder, the rock shaft is rotated. As the rock shaft rotates, the sub-frame moves up or down to change the depth in which the tool or plurality of tools 628 penetrates into the underlying ground surface.

Similar to the previously described embodiments, the ECU 212 can control a position of a control valve between an open and closed position. In the open position, hydraulic fluid can flow through a first flow path through the control valve to provide a series hydraulic control. The series hydraulic control allows hydraulic fluid to flow to each of a plurality of actuators for operably adjusting the depth of tools 628 coupled to different sub-frames. In FIG. 6, for example, hydraulic fluid can flow to the first actuator 630 and second actuator 632 in series so that the plurality of tools 628 mounted to the first sub-frame 616 and second sub-frame 618 may be controllably adjusted to different depths. In FIG. 6, the aforementioned rock shafts are not shown, but in this embodiment, a rock shaft would be coupled between the first actuator 630 and the first sub-frame 616, and a different rock shaft would be coupled between the second actuator 632 and the second sub-frame 618. A similar arrangement may be provided with respect to the third sub-frame 620, the fourth sub-frame 622, the fifth sub-frame 624, and the sixth sub-frame 626.

If, however, only one of the sub-frames needs to be adjusted to meet a desired tool depth, then parallel control may be used to achieve the desired depth. Here, the control valve may be closed so that hydraulic fluid does not pass therethrough. With the valve closed, fluid may flow through a parallel flow path similar to that shown in FIG. 3 and identified as the second flow path 310. The ECU 212 may operably control a different control valve so that fluid may flow through that particular control valve and to the actuator that is able to adjust the height of the respective sub-frame. In FIG. 6, for example, an actuator (not shown) may receive hydraulic fluid through the parallel flow path so that the third sub-frame 620, the fourth sub-frame 622, the fifth sub-frame 624, or the sixth sub-frame 626 may be adjusted. As also described, depending upon which sub-frame is adjusted, a secondary corrective action may be required in a similar manner as described above.

In an embodiment similar to the previous one, a tool or plurality of tools may be coupled directly to the rock shaft. In this embodiment, there may not be a sub-frame, but the tool or plurality of tools may be operably controlled in a similar manner as previously described.

Another aspect of the present disclosure is the ability to level the machine and achieve a uniform and consistent tool depth regardless of machine width or firmness of the underneath ground or soil. Many conventional tillage machines, for example, require manual adjustments via turnbuckles and the like to achieve machine levelling. Other conventional machines may include some degree of hydraulic levelling, but even these machines require an operator or user to set or establish a target level. This form of machine levelling often introduces human error which leads to inconsistent and imprecise settings.

In addition, environmental conditions often make it difficult to achieve machine levelling. For instance, if a machine is first leveled on a flat concrete slab, the machine may not be level from side-to-side across the width of the machine or from front-to-back due to changes in the firmness of the soil or differences in tire deflection at various locations across the machine. In some instances, a tillage machine may stretch 40-90 feet in width, and the soil may be firm at one end of the machine but soft at the opposite end. The wheel or wheels at the end at which the soil is soft may sink into the soil more than the wheel or wheels at the opposite end, thus producing an uneven machine. Further, an operator's vision may be limited when detecting when the machine is level. If a tool depth of 2-4 inches is desired and the tillage machine is 70 feet wide, the operator must evaluate and determine if the machine 35 feet to either side is level with one another. If the operator is off by 0.5-1.0 inch, this can introduce error in the machine operation.

In the previously described embodiments, tool depth or depth control systems and methods are described. In these embodiments, a distance or position between a wheel and frame to which the wheel is coupled were made uniform across the width of the machine. In the embodiments of FIGS. 7-10, various systems and methods provide for uniform tool depth by establishing uniform frame height across the machine and in the fore and aft direction with respect to the ground or underlying surface.

Figure 7:
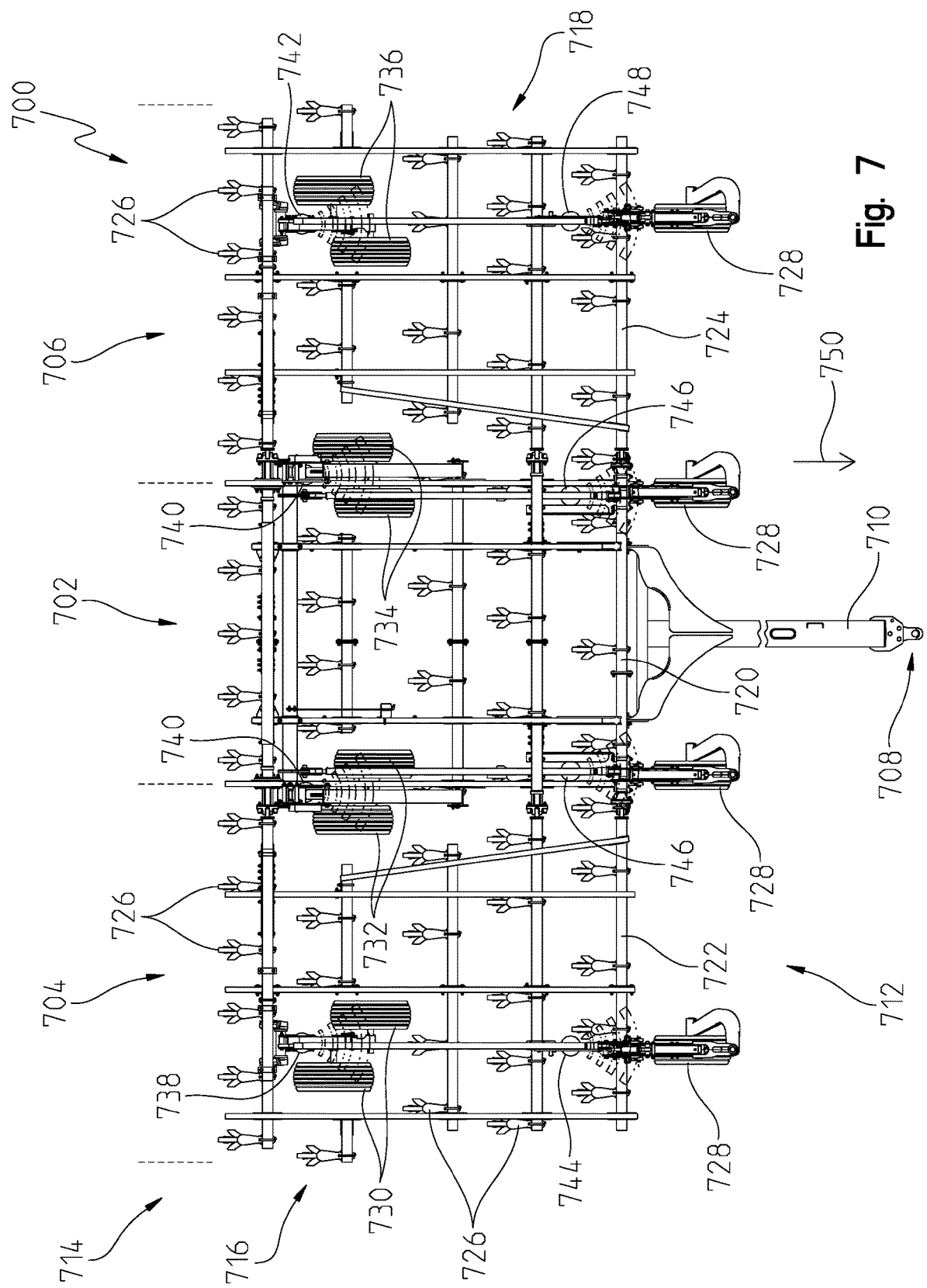
FIG. 7 is an elevated view of a further embodiment of an agricultural implement.

Referring to FIG. 7, an agricultural implement 700 such as a field cultivator is shown. Similar to the implement 100 of FIG. 1, the implement 700 is designed to couple to a work machine and perform a work function. For example, the implement may include work tools 726 that penetrate into soil for aerating the soil before planting or uprooting weeds after planting. The implement 700 may be attached at its front end 712 to a work machine or tractor (not shown) by a hitch assembly 708 such as a three-point hitch or a drawbar attachment. The hitch assembly 708 includes a hitch frame member 710 that extends longitudinally in a direction of travel 750 for coupling to the work machine or tractor.

The agricultural implement 700 may include a transversely-extending frame that forms multiple frame sections. In FIG. 7, for example, the implement 700 includes a main or center frame 702. The main frame 702 is coupled to the hitch assembly 708 as shown. A first frame section 704 is disposed to one side 716 of the main frame 702, and a second frame section 706 is disposed to an opposite or second side 718 thereof. While not shown, other implements may include additional frame sections coupled to the first and second frame sections similar to that shown in FIG. 1.

Each frame section may be pivotably coupled to the frame section adjacent thereto. The first frame section 704, for example, may be pivotably coupled to the main frame 702 so that it can be folded in an upright position or unfolded in the position shown in FIG. 7. Similarly, the second frame section 706 may be pivotably coupled to the main frame 702 so that it can be folded in an upright position or unfolded in the position shown in FIG. 7.

As shown in FIG. 7, the implement 700 has a front end or side 712, a rear end or side 714, a first side 716, and a second side 718. In this disclosure, the width of the implement is defined between the first and second sides, and the fore-and-aft direction refers to the length or distance between the front end 712 and rear end 714 of the implement 700.

The implement 700 may be supported by a plurality of wheels. For example, a plurality of front wheels 718 are coupled at the front end 712 thereof. The main frame section 702 includes a main frame member 720 which is supported by at least one of a first set of wheels 732 and a second set of wheels 734. The first frame section 704 may include a first frame member 722 which is supported by at least a third set of wheels 730. In addition, the second frame section 706 may include a second frame member 724 which is supported by a fourth set of wheels 736. While each section is shown being supported by a different set of wheels, this is only shown in the illustrated embodiment. In other embodiments, there may be only a single wheel supporting each frame section. In a different embodiment, there may be more than two wheels supporting each frame section. Thus, for purposes of this disclosure, a set of wheels may include one or more wheels. Further, the first set of wheels 732 and second set of wheels 734 may include two wheels each. One of the two wheels may support the main frame section 702 Moreover, the implement 100 may include more than the front wheels 728.

In the illustrated embodiment of FIG. 7, a plurality of sensors is coupled to the implement 700 at locations on or near each wheel module. The plurality of sensors may be ultrasonic, optical, radar, or laser sensors. Other sensors may include position sensors (e.g., potentiometer, hall effect, etc.). The plurality of sensors may be coupled to the different frame members and positioned such that each sensor is oriented towards the ground or underlying surface. Each sensor can therefore detect the distance between its location and the ground. In FIG. 7, the plurality of sensors may include a first sensor 738, a second sensor 740, and a third sensor 742. Each of these sensors may be positioned toward the rear 714 of the implement 700, and at or near each of the sets of rear wheels 730, 732, 734, 736. The plurality of sensors may also include a fourth sensor 744, a fifth sensor 746, and a sixth sensor 748. Each of these sensors may be positioned toward the front 712 of the implement 700.

The first sensor 738 and the fourth sensor 744 may each be coupled to the first frame section 704 at the front end 712 and rear end 714, respectively. The second sensor 740 and fifth sensor 746 may be coupled to the main frame section 702 at the front end 712 and rear end 714, respectively. As shown, the second sensor 740 may actually include two second sensors spaced from one another. One of the second sensors 740 may be coupled to the frame member 720 at or near the first set of wheels 732, and the other second sensor 740 may be coupled to the frame member 720 at or near the second set of wheels 734. Similarly, the fifth sensor 746 may include two fifth sensors spaced from one another. One of the fifth sensors 746 may be coupled to the frame member 720 towards the front end 712 and aligned with one of the second sensors 740, and the other of the fifth sensors 746 may be coupled to the frame member 720 towards the front end 712 of the implement and aligned with the other of the second sensors 740. The third sensor 742 and the sixth sensor 748 may each be coupled to the second frame section 706 at the front end 712 and rear end 714, respectively.

Each of the plurality of sensors may be disposed in electrical communication with the ECU 212. The ECU 212 may include logic, algorithms, look-up tables, etc. for executing machine levelling control methods in accordance with this disclosure. Alternatively, the controller 206 of the work machine 200 may include logic, algorithms, etc. for executing the control methods. In any event, the plurality of sensors shown in FIG. 7 may detect the distance from the frame to which the sensor is mounted and the ground, and communicate the detected distance to the ECU 212 or controller 206.

In one non-limiting example, the implement 700 may include a plurality of work tools 726 for performing a work function. The plurality of work tools 726 may include rippers, disks, closers, etc. Each of the plurality of work tools 726 may be coupled to a frame member or a sub-frame member, as will be described below. The plurality of work tools 726 may be coupled to the respective frame member at a defined distance therefrom. Thus, if the work tool 726 is approximately two inches below the frame member, and one of the sensors detects a distance of four inches from ground, the ECU 212 or controller 206 may determine that the work tool 726 is approximately two inches above the ground. This relationship between the work tool and frame member may be fixed such that the detected measurement by each sensor may be used for executing a machine levelling control process. This will be described in further detail below.

Figure 8:
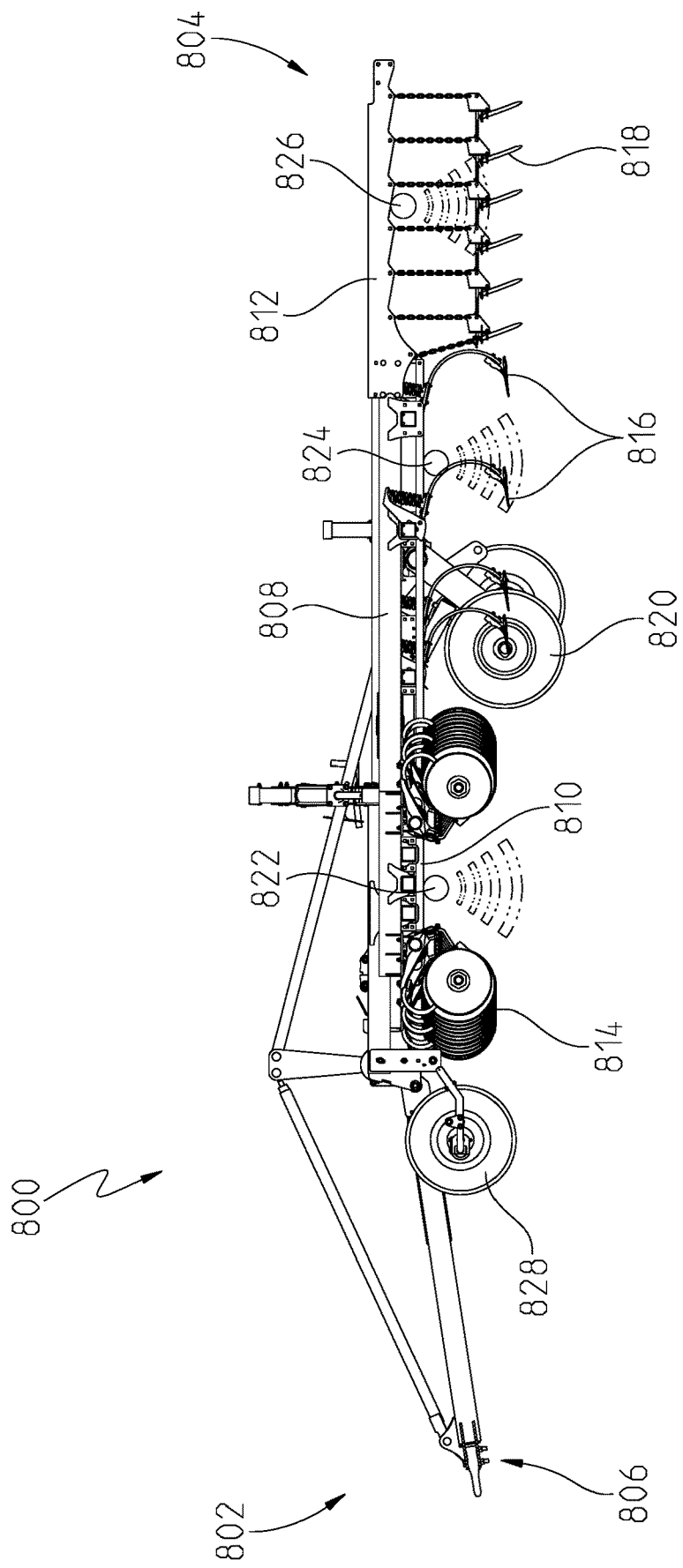
FIG. 8 is a side view of an agricultural implement.

With reference to FIG. 8, an implement 800 is shown. The implement 800 may include multiple sections, or it may only include a single section. In any event, the implement 800 may include a hitch assembly 806 coupled thereto at its front end 802 for coupling to a work machine (not shown). The implement 800 may include a main frame 808 that is coupled to the hitch assembly 806. The implement 800 may also include one or more sub-frames coupled thereto. In FIG. 8, for example, a first sub-frame 810 and a second sub-frame 812 are shown. Different work tools may be coupled to each sub-frame and the main frame 808. At least in this embodiment, the first sub-frame 810 is disposed towards the front end 802 of the implement 800, whereas the second sub-frame 812 is disposed towards a rear end 804 thereof.

The frames may be supported by one or more wheels 820, 828. In this embodiment, a front wheel 828 supports the implement 800 at its front end 802, and a rear wheel 820 supports the rear end 804 of the implement 800. Moreover, a first work tool 814 may be coupled to the first sub-frame 810, a second work tool 816 may be coupled to the main frame 808, and a third work tool 818 may be coupled to the second sub-frame 812.

As also shown, a first sensor 822 is coupled to the first sub-frame 810 and is configured to detect the distance between the first sub-frame 810 and the underlying surface. Similarly, a second sensor 824 is coupled to the main frame 808 and is configured to detect the distance between the main frame 808 and the underlying surface. Further, a third sensor 826 is coupled to the second sub-frame 812 and is configured to detect the distance between the second sub-frame 812 and the underlying surface. In some instances, the sub-frames may be coupled to and below the main frame. Thus, the distance between the first work tool 814 and the underlying surface may be different than the distance between the second work tool 816 and the underlying surface. The same may be true with respect to the third work tool 818. Since the distance between the respective frame and work tool may be predefined and stored within a memory unit of the ECU 212 or controller 206, the ECU 212 or controller 206 may accurately detect the distance between the work tool and the underlying surface to achieve uniform and desired tool depth.

In some cases, a drawbar height may be differing for different work machines. This varying height can impact depth control. With the sensors located at each frame section and on main frames and sub-frames, the depth of penetration of each work tool can be precisely controlled. Moreover, if a front wheel sinks into softer soil the implement 800 may become uneven in the fore-and-aft direction, i.e., the front end 802 of the implement 800 may be lower than the rear end 804. The first sensor 822 may detect this change in distance between the first sub-frame 810 and the ground and communicate the detected distance to the ECU 212 or controller 206. In turn, and to be described below, the ECU 212 or controller 206 may adjust the height of the first sub-frame 810 with respect to the ground without requiring any user intervention. Similar adjustments can be made to the main frame 808 and second sub-frame 812 as necessary. Thus, the implement 800 may be adjustably controlled to maintain a level orientation with respect to the ground to ensure proper work tool depth during operation.

Figure 9:
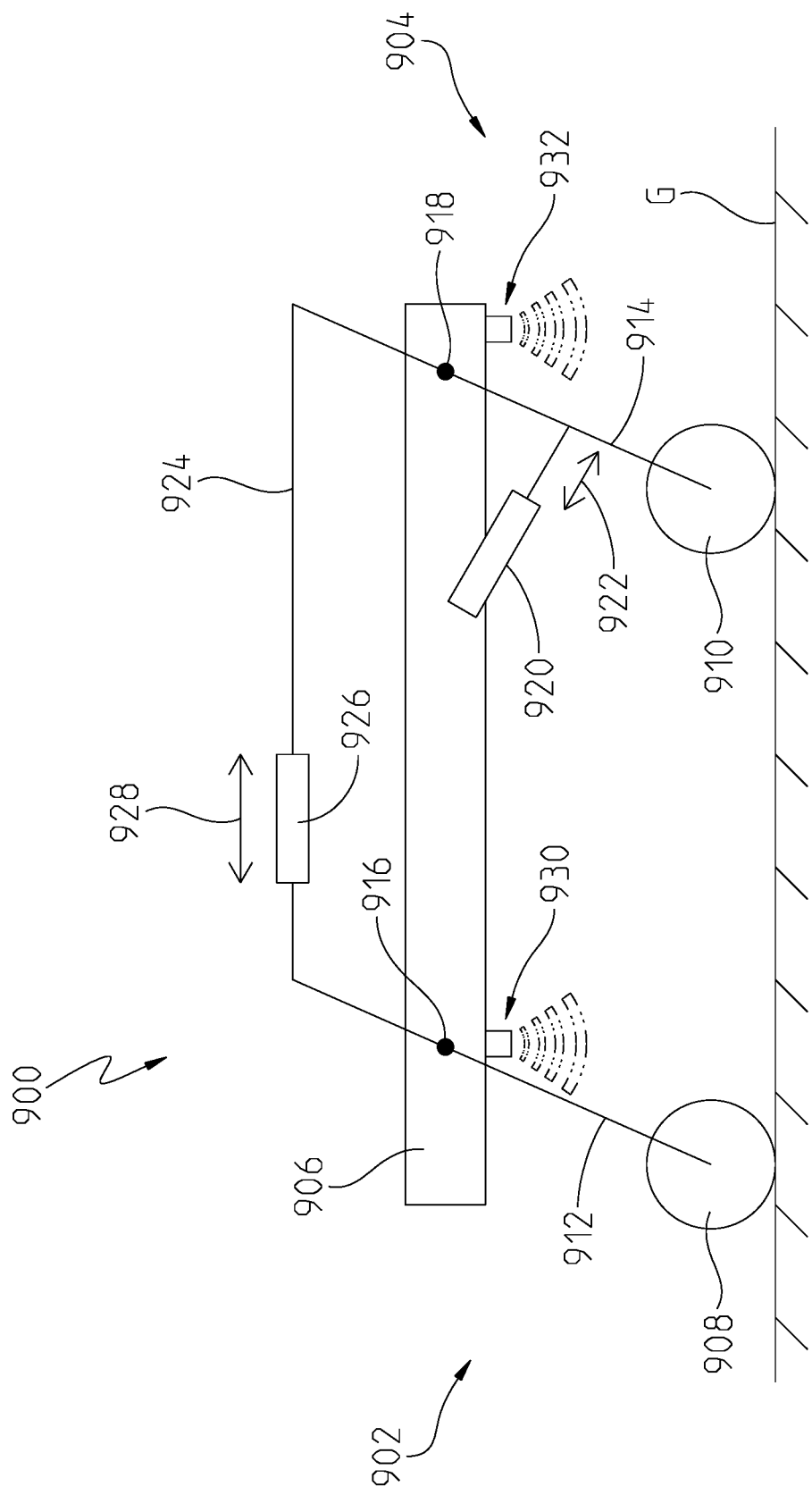
FIG. 9 is a schematic of an agricultural implement.

This is further shown in FIG. 9. In this schematic, an implement 900 or machine is shown positioned along an underlying surface or ground, G. While this embodiment refers specifically to an implement, a similar application may be made with respect to a machine. The implement 900 may travel in a forward direction where its front end 902 faces the forward direction, and its rear end 904 is disposed at an opposite end. The implement 900 may include a front wheel 908 and a rear wheel 910 for supporting a main frame 906. A front wheel arm 912 is coupled to the front wheel 908 and pivotably coupled to the main frame 906 at a first pivot location 916. Likewise, a rear wheel arm 914 is coupled to the rear wheel 910 and pivotably coupled to the main frame 906 at a second pivot location 918.

The implement 900 may further include a linkage 924 that is connected to the front wheel arm 912 and rear wheel arm 914, as shown in FIG. 9, to adjust the height of the front 902 of the implement 900 relative to the rear 904. In many conventional applications, a turnbuckle is used for mechanically adjusting the linkage in the fore and aft direction. An actuator 920 may be coupled to the frame 906 and actuate in a direction indicated by arrow 922 to raise and lower the frame 906 relative to the front and rear wheels. The turnbuckle, however, is actuated by a user or operator via a wrench to mechanically adjust the linkage.

In the present disclosure, however, an actuator 926 is used to operably adjust the linkage 924 without a user or operator having to make any mechanical adjustments. A controller such as the ECU 212 may be in electrical communication with the actuator to extend or retract the actuator in a direction indicated by arrow 928 to adjust the linkage 924. In an alternative embodiment, the actuator may be hydraulically controlled to adjust the linkage 924. Thus, the rear actuator 920 may automatically adjust the height of the frame 906 with respect to the ground, G, and the linkage actuator 926 may pitch the implement or machine either forward or backward to achieve desirable machine levelling. In particular, the linkage actuator 926 may be actuated to adjust the length of the linkage and therefore adjust the height of the front 902 of the implement 900. Moreover, with work tools being coupled to the main frame 906 of the implement 900, tool depth may be adjusted by extending or retracting either the linkage actuator 926 or the rear actuator 920 to achieve desired tool depth.

In the illustrated embodiment of FIG. 9, the implement 900 may also include a first sensor 930 and a second sensor 932. The first sensor 930 may be positioned towards the front of the machine near the front wheel 908, and the second sensor 932 may be positioned towards the rear of the machine near the rear wheel 910. Each sensor may be in electrical communication with the ECU 212 or controller 206 and communicate a distance from the frame 906 to the ground, G. If the front wheel 908 begins to sink in softer mud, the first sensor 930 may detect a shorter distance from the front of the frame 906 to the ground compared to the distance detected by the second sensor 932 of the rear of the frame 906 to the ground. As such, the implement 900 may be pitched forward and thus uneven. The ECU 212 or controller 206 can operably control the linkage actuator 926 according to any known means (e.g., electrically, hydraulically, etc.) to adjust the linkage 924 to achieve a level orientation of the implement 900. For instance, the actuator 926 may retract and thus shorten the linkage 924 to bring about the level orientation.

In previous embodiments, tool depth is controlled via a series and parallel control system such as shown in FIGS. 1-6. Here, Hall Effect sensors or the like may be positioned on or near the wheels to detect the position of the wheel relative to the frame. The position of the wheel relative to the frame is used to infer or calculate the distance of the tool from the ground. In some aspects, user input is used to establish a distance or height of the tool from the ground. In the embodiments of FIGS. 7-10, the same control system may be used to achieve implement or machine levelling. For example, the rear actuator 920 in FIG. 9 may be hydraulically coupled to the control system 300 of FIG. 3. Here, fluid from the main pressure source 302 can flow through the first fluid path 308 into the second fluid path 310. The second fluid path 310 is part of the parallel flow that may be used to control both tool depth and machine levelling across the width of the machine or implement.

Figure 10:
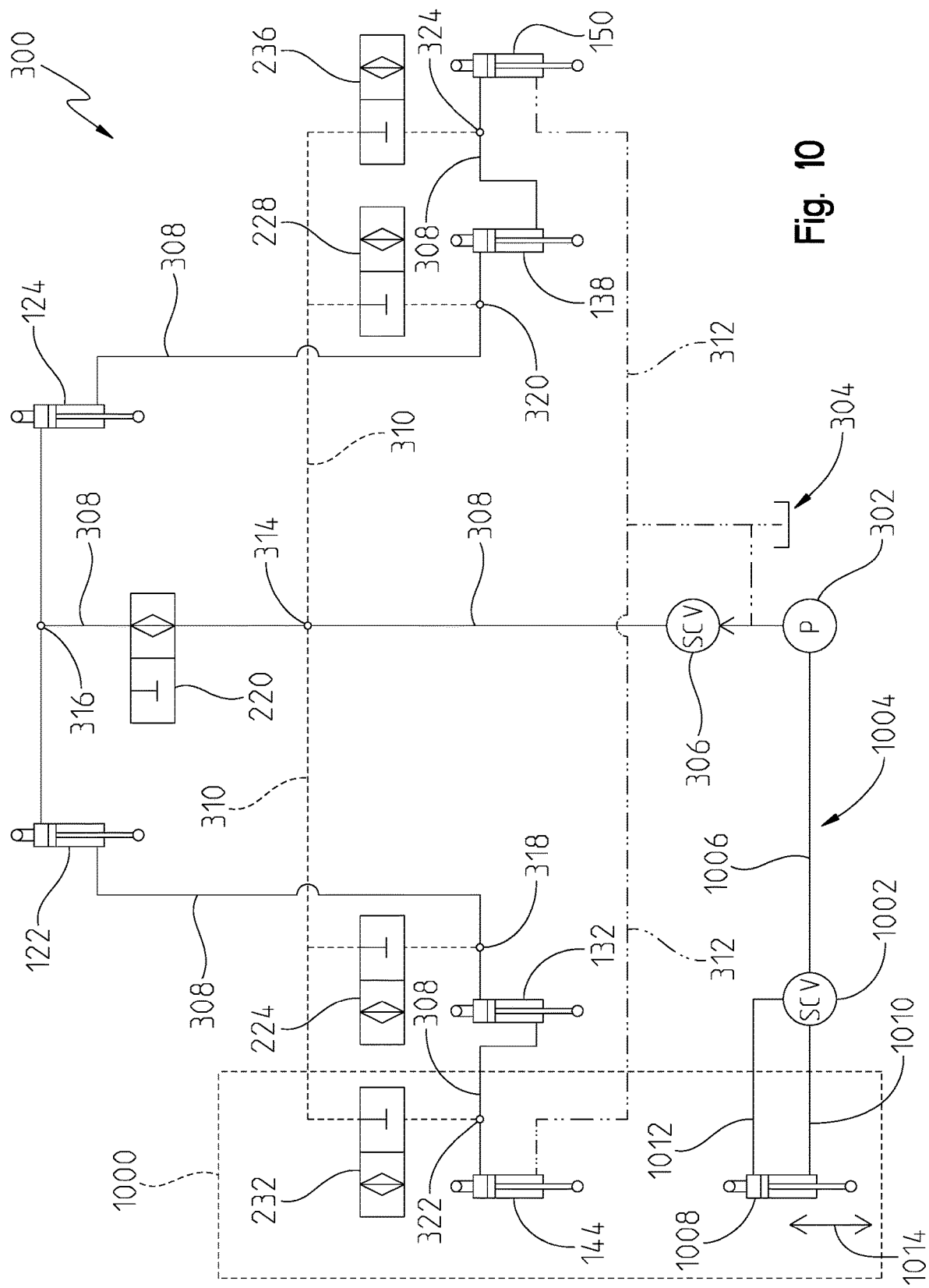
FIG. 10 is a diagram of a hydraulic control system of a work machine and agricultural implement.

Referring, for example, to FIGS. 3, 7 and 10, the height of each frame section 702, 704, 706 may be adjustably leveled by utilizing the sensors 738, 740, 742, 744, 746, and 748 coupled thereto. For example, if the first frame section 704 is detected by its sensors 738, 744 to be 1.5 inches lower than the main frame section 702 and the second frame section 706, the ECU 212 or controller 206 may hydraulically control fluid to flow through the second flow path 310 and to an actuator such as the rear actuator 920 shown in FIG. 9. A control valve similar to the control valves 220, 224, 228, 232, and 236 shown in FIG. 10 may be electrically controlled to its open position by the ECU 212 or controller 206 to allow fluid to flow therethrough and hydraulically actuate the actuator 920. As previously described, the rear actuator 920 may be operably controlled to adjust the height of the frame relative to the ground. As such, actuation of the rear actuator 920 of the first frame section 704 can raise the frame 722 until it is level with the main frame section 702 and the first frame section 706.

In an embodiment similar to FIG. 1 where the implement includes more than three frame sections, corrective action may be necessary in which one of the inner frame section heights is adjusted. The corrective action, as described above, adjusts the outer frame section height after the inner frame section height is adjusted.

While FIGS. 3 and 10 illustrate a parallel-series control system, the implement or machine may be leveled via a parallel-only control system.

Referring now to FIG. 10, to level an individual frame section 1000 in the fore and aft direction and maintain the front wheels and rear wheels on the same plane, a second control circuit 1004 may be provided. Here, a pressure line 1006 may be fluidly coupled between the pressure source 302 and a second selective control valve 1002. The control valve 1002 may be an electro-hydraulic valve that is actuated by the ECU 212 or controller 206. Alternatively, the valve may be a 3-position valve that is biased in a normally closed position. A first pressure line 1010 and a second pressure 1012 may fluidly couple the valve 1002 to an actuator 1008. For purposes of this embodiment, the actuator is a hydraulic actuator that may correspond with the linkage actuator 926 of FIG. 9. A piston may be hydraulically actuated in a direction indicated by arrow 1014 to either extend or retract the linkage 924 and thus adjust the front of the frame relative to the rear. Other types of valves and actuators may be used to control the orientation of the frame in the fore and aft direction.

As previously described, various types of sensors and sensing technologies may be used for machine or implement levelling. These may include ultrasonic, optical, radar, and laser. Position sensors such as potentiometers and hall effect sensors may be used. Alternatively, a gyroscope or tilt sensor may be positioned on each frame section such that an angle of the section may be calculated with respect to other sections of the machine or implement. As such, the height of one section may be determined based on the height of another. Other similar technologies may be used for achieving a level machine or implement across its width and from front-to-back.

Figure 11:
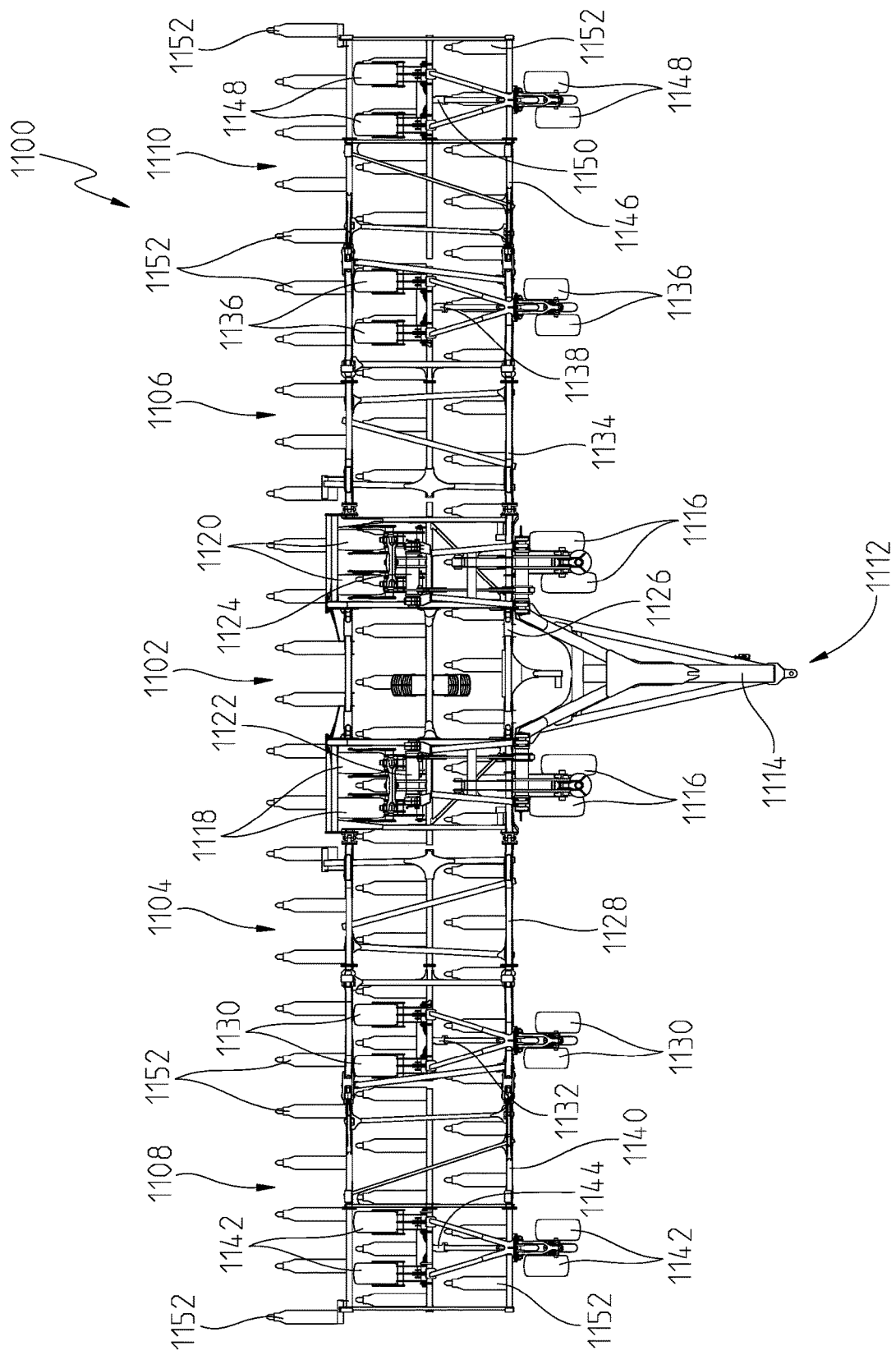
FIG. 11 is an elevated view of an air seeder.

Referring to FIG. 11, an alternative embodiment of the agricultural implement 700 of FIG. 7 is shown in terms of an air seeder implement 1100. The air seeder implement 1100 may be constructed similar to the field cultivator of FIG. 7 such that it is designed to couple to a work machine and perform a work function. For example, the air seeder implement 1100, or seeding implement, may include ground-engaging tools or openers for opening one or more furrows in the underlying soil for planting seed or depositing fertilizer or other substances. The air seeder implement 1100 may be attached to a work machine or tractor (not shown) by a hitch assembly 1112 such as a three-point hitch or a drawbar attachment. The hitch assembly 1112 includes a hitch frame member 1114 that extends longitudinally in a direction of travel for coupling to the work machine or tractor.

The air seeder implement 1100 may include a transversely-extending frame that forms multiple frame sections. In FIG. 11, for example, the implement 1100 includes a main or center frame 1102. The main frame 1102 is coupled to the hitch assembly 1112 as shown. A first frame section or first inner frame 1104 is disposed to one side of the main frame 1102, and a second frame section or second inner frame 1106 is disposed to an opposite side thereof. In addition, a third frame section or first outer frame 1108 is disposed to an outside of the first inner frame 1104, and a fourth frame section or second outer frame 1110 is disposed to an outside of the second inner frame 1106. Each frame section may be pivotably coupled to the frame section adjacent thereto. The first inner frame 1104, for example, may be pivotably coupled to the main frame 1102 and the first outer frame 1108. Similarly, the second inner frame 1106 may be pivotably coupled to the main frame 1102 and the second outer frame 1110.

The implement 1100 may be supported by a plurality of wheels. For example, a pair of front wheels 1116 are coupled to the frame at a front end thereof. The main frame 1102 may be supported by a first pair of wheels 1118 and a second pair of wheels 1120. The first inner frame 1104 may be supported by wheels 1130 and the second inner frame 1106 may be supported by wheels 1136. Likewise, the first outer frame 1108 may be supported by wheels 1142 and the second outer frame 1110 may be supported by wheels 1148. While each section is shown being supported by a different pair of wheels, this is only shown in the illustrated embodiment. In other embodiments, there may be only a single wheel supporting each frame section. In a different embodiment, there may be more than a pair of wheels supporting each frame section. Moreover, the implement 1100 may include more than the front wheels 1116. For instance, there may be back wheels disposed near the rear of the implement for additional support.

In the illustrated embodiment of FIG. 11, the air seeder implement 1100 may include a plurality of actuators for controlling movement of the frame. Each actuator may be a hydraulic actuator, electric actuator, or any other known actuator. Moreover, each actuator may include an outer body or cylinder in which a rod or piston moves between an extended position and a retracted position. In FIG. 11, the main frame 1102 includes a first actuator 1122 and a second actuator 1124. The first pair of wheels 1118 may be coupled to the main frame 1102 via a rock shaft (not shown) that may be hydraulically actuated by the first actuator 1122. The second pair of wheels 1120 may be coupled to the main frame 1102 via another rock shaft (not shown) that may be hydraulically actuated by the second actuator 1124. The actuators can raise or lower the main frame 1102 relative to the wheels 1118, 1120, as will be described below.

The first inner frame 1104 may include an actuator 1132 for raising or lowering the first inner frame 1104. Similarly, the second inner frame 1106 may include an actuator 1138 for controlling a raising or lowering movement of the second inner frame 1104. The first outer frame 1108 may include an actuator 1144 and the second outer frame 1110 may include an actuator 1150. The actuator 1144 may control raising and lowering of the first outer frame 1108 and the actuator 1150 may control raising and lowering of the second outer frame 1110.

In FIG. 11, the main frame 1102 includes a plurality of main frame members 1126. A plurality of ground-engaging tools or openers 1152 may be coupled to the main frame members 1126 for engaging a ground surface or soil upon which the implement 1100 travels. Similarly, the first inner frame 1104 includes a plurality of first inner frame members 1128, the second inner frame 1106 includes a plurality of second inner frame members 1134, the first outer frame 1108 includes a plurality of first outer frame members 1140, and the second outer frame 1110 includes a plurality of second outer frame members 1146. Each of these frame members may include a plurality of ground-engaging tools or openers 1152 coupled thereto.

While FIG. 11 represents an illustrated embodiment of an air seeder implement with five frame sections, this disclosure is not limited to this embodiment. Other embodiments may include only three sections with a main frame and two outer frames. Alternatively, there may be more than five frame sections in further embodiments. Thus, this disclosure is not limited to any number of frame sections, and the teachings herein may be applicable to any multi-section implement.

Figure 12:
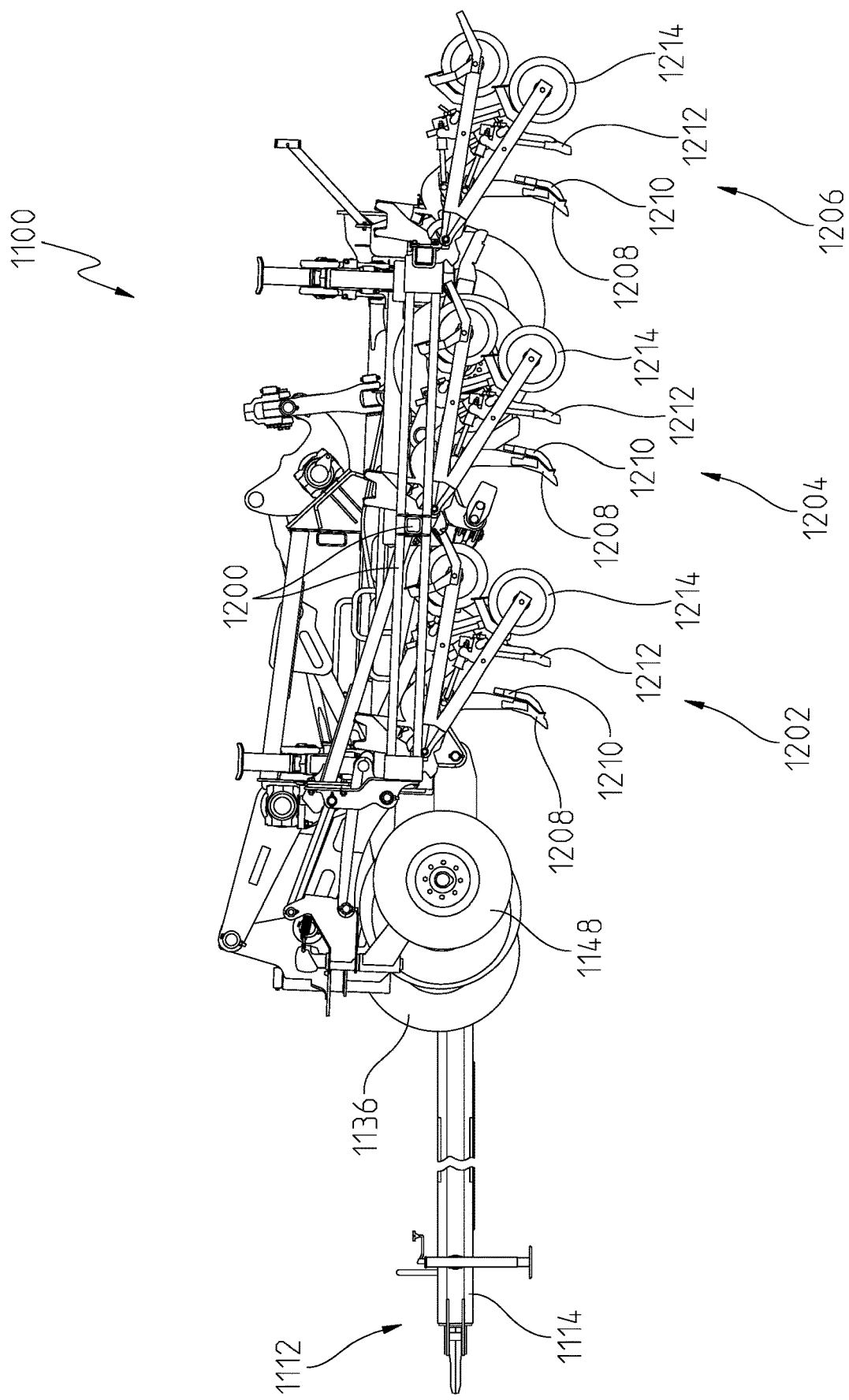
FIG. 12 is a side view of the air seeder of FIG. 11.

Referring to FIG. 12, a side view of the air seeder implement 1100 of FIG. 11 is further illustrated. Here, the air seeder includes a frame 1200 which may form part of the second outer frame member 1146. The frame 1200 may be constructed similarly to that of FIGS. 8 and 9 and include a main frame and sub-frames, as necessary. The sensors and actuators depicted in FIGS. 7-10 may also be incorporated to the air seeder implement 1100 of FIGS. 11 and 12 for performing automated machine levelling. The description of these embodiments may be incorporated into the embodiments of FIGS. 11 and 12. In addition, the wheels 1148 may be coupled to the frame 1200. The wheels 1148 may include a pair of wheels at the front of the implement 1100 and a pair of wheels at the rear thereof, as shown in FIG. 12.

In this view, the air seeder implement 1100 may be configured as a combination seeder and fertilizing implement. In this configuration, the implement 1100 may include a plurality of ground-engaging tool or opener assemblies 1152. In FIG. 12, for example, a first ground-engaging tool or opener assembly 1202 is disposed at a front end of the implement 1100, a second ground-engaging tool or opener assembly 1204 is disposed to the rear of the first ground-engaging tool or opener assembly 1202, and a third ground-engaging tool or opener assembly 1206 is disposed at a rear of the implement 1100. Each ground-engaging tool or opener assembly is shown including a furrow or trench opener 1208. The furrow or trench opener 1208 may be configured as any furrow opener configured to engage the soil and form a trench in it. Thus, its design for purposes of this disclosure may be any conventional furrow opener known in the art.

A seed distribution tube 1210 may be coupled to or adjacently to the rear of the opener 1208. In this manner, seed may be deposited into the furrow or trench formed by the opener 1208. The ground-engaging tool or opener assembly may also include a second tube or distributor 1212 for depositing fertilizer or other substance into the furrow along with the seed. Once the seed and fertilizer has been distributed into the furrow or trench, a disk or wheel 1214 may close the furrow or trench.

Other components may also be included with the air seeder implement 1100. For instance, depth gauging wheels may be used to measure the depth of the furrow or trench to ensure that the seed is planted at the appropriate depth. Moreover, actuators, rockshafts, or other components for adjusting the depth may be used as well. The actuators and control system described in FIGS. 7-10 may be used with the air seeder implement 1100 for automated machine levelling and depth control. Further, while three ground-engaging tool or opener assemblies are shown in FIG. 12, it is to be understood that any number of these assemblies may be coupled to the frame 1200 to achieve the planting and fertilizing operation.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A seeding implement including a plurality of tools for performing a work function, comprising:
   a multi-section frame including a first frame section, a second frame section, and a third frame section, where the first frame section is disposed between the second and third frame sections;
   a user control for communicating a desired tool depth of the plurality of tools;
   a first actuator coupled to the first frame section, a second actuator coupled to the second frame section, and a third actuator coupled to the third frame section;
   a first sensor coupled to the first frame section, the first sensor configured to detect a first height of the first frame section from an underlying surface;
   a second sensor coupled to the second frame section, the second sensor configured to detect a second height of the second frame section from the underlying surface;

a third sensor coupled to the third frame section, the third sensor configured to detect a third height of the third frame section from the underlying surface;

a control unit disposed in electrical communication with the user control, the first sensor, the second sensor, and the third sensor, the controller operably controlling the first actuator, the second actuator and the third actuator in response to the user control, the first sensor, the second sensor and the third sensor;

wherein, the control unit compares the first height, the second height, and the third height to one another and determines if each height is equal to or within a threshold limit of one another;

further wherein, when one of the first height, second height or third height is determined not to be equal to or within the threshold limit of the other two heights, the controller determines which frame section is uneven with the other two frame sections and actuates the actuator that is coupled to the uneven frame section until the first height, second height, and third height are equal or within the threshold limit of one another.

2. The seeding implement of claim 1, further comprising a fourth sensor, a fifth sensor, and a sixth sensor, the fourth sensor being coupled to the first frame section, the fifth sensor being coupled to the second frame section, and the sixth sensor being coupled to the third frame section.

3. The seeding implement of claim 2, wherein:
the first sensor is coupled at a front end of the first frame section and the fourth sensor is coupled at a rear end thereof, the first sensor detecting a front height of the first frame section and the fourth sensor detecting a rear height of the first frame section;

the second sensor is coupled at a front end of the second frame section and the fifth sensor is coupled at a rear end thereof, the second sensor detecting a front height of the second frame section and the fifth sensor detecting a rear height of the second frame section; and the third sensor is coupled at a front end of the third frame section and the sixth sensor is coupled at a rear end thereof, the third sensor detecting a front height of the third frame section and the sixth sensor detecting a rear height of the third frame section.

4. The seeding implement of claim 3, further comprising:
a linkage pivotably to one of the first, second or third sections of the frame for adjustably controlling a pitch of the frame; and a linkage actuator coupled to the linkage for adjusting a length of the linkage;

wherein, if a front height of one of the frame sections is detected not to be equal to or within a threshold limit of the rear height of the respective frame section, the control unit operably actuates the linkage actuator to adjust the length of the linkage until the front height is equal to or within the threshold limit of the rear height.

5. The seeding implement of claim 4, further comprising a fluid circuit fluidly coupled to a fluid source, the fluid circuit including a control valve disposed in fluid communication with the linkage actuator;

wherein, the control valve is operably controlled to actuate the linkage actuator between a retracted position and an extended position.

6. The seeding implement of claim 1, wherein at least one of the first sensor, second sensor, and third sensor is ultrasonic, radar, optical, or laser.

7. The seeding implement of claim 1, further comprising:
a fluid source for providing hydraulic fluid;
a first control valve operably controllable between an open position and a closed position, the first control valve fluidly coupling the fluid source to the first actuator in the open position;
a second control valve operably controllable between an open position and a closed position, the second control valve fluidly coupling the fluid source to the second actuator in its open position;
a third control valve operably controllable between an open position and a closed position, the third control valve fluidly coupling the fluid source to the third actuator in its open position; and
a flow path defined between the fluid source, the first actuator, the second actuator, and the third actuator, the flow path fluidly coupling the first, second and third actuators in parallel with one another.

8. The seeding implement of claim 7, wherein:
the height of the first frame section is controllably adjusted by the first actuator when the first control valve is in its open position and the second and third control valves are in their closed positions;
the height of the second frame section is controllably adjusted by the second actuator when the second control valve is in its open position and the first and third control valves are in their closed positions; and
the height of the third frame section is controllably adjusted by the third actuator when the third control valve is in its open position and the first and second control valves are in their closed positions.

9. The seeding implement of claim 1, comprising:
a fourth actuator coupled to the first frame section;
a fluid source for providing hydraulic fluid;
a first control valve operably controllable between an open position and a closed position, the first control valve being fluidly coupled between the fluid source and the first and fourth actuators;
a second control valve operably controllable between an open position and a closed position, the second control valve being fluidly coupled to the third actuator in its open position;
a third control valve operably controllable between an open position and a closed position, the third control valve being fluidly coupled to the third actuator in its open position;
the control unit configured to control the first, second and third control valves between their respective open and closed positions;
a first flow path defined between the fluid source and the second and third actuators, the first flow path fluidly coupling the first actuator, the second actuator, the third actuator, and the fourth actuator in series with one another when the first control valve is in its open position, the second control valve is in its closed position, and the third control valve is in its closed position; and
a second flow path defined between the fluid source and the second and third actuators, the second flow path fluidly coupling at least the second and third actuators in parallel with one another when the first control valve is in its closed position, and either the second control valve or the third control valve is in its open position.

10. The seeding implement of claim 9, wherein each frame section includes the plurality of tools for penetrating a soil upon which the implement travels;

further wherein, each of the first, second, and third sensor operably detects a depth of penetration of the plurality of tools coupled to each frame section and communicates the detected depth to the electronic control unit, the electronic control unit compares the detected depth to a target depth and operably controls the position of each control valve until the depth of the plurality of tools on each frame section is at the target depth.

11. The seeding implement of claim 9, further comprising:
a fourth frame section coupled to the second frame section, the fourth frame section including a fifth actuator for controlling a raising or lowering movement of the fourth frame section;
a fifth frame section coupled to the third frame section, the fifth frame section including a sixth actuator for controlling a raising or lowering movement of the fifth frame section;
a fourth control valve operably controllable between an open position and a closed position, the fourth control valve being fluidly coupled to the fifth actuator in its open position; and
a fifth control valve operably controllable between an open position and a closed position, the fifth control valve being fluidly coupled to the sixth actuator in its open position;
wherein, the first flow path fluidly couples the first, second, third, fourth, fifth, and sixth actuators in series with one another when only the first control valve is in its open position, and the second flow path fluidly couples the second, third, fifth, and sixth actuators in parallel with one another when the first control valve is in its closed position.

12. The seeding implement of claim 11, wherein, when the control unit determines either the second frame section or the third frame section is not at a target depth, the control unit operably performs a primary hydraulic adjustment by closing the first control valve and opening either the second or third control valve so that hydraulic fluid from the fluid source flows through the second flow path to either the second or third actuator to raise or lower the second or third frame section until the depth of the first frame section, the second frame section and the third frame section are at the target depth.

13. The seeding implement of claim 12, wherein once the depth of the second frame second or the third frame section is operably controlled to the target depth, the control unit operably performs a secondary hydraulic adjustment by maintaining the first control valve in its closed position, controlling the second and third control valves to their closed positions, and operably controlling either the fourth or fifth control valve to its open position so that hydraulic fluid from the fluid source flows through the second flow path until the depth of the first frame section, the second frame section, the third frame section, the fourth frame section, and the fifth frame section are at the target depth.

14. The seeding implement of claim 1, comprising:
a plurality of control valves operably controllable between an open position and a closed position, the plurality of control valves including at least a first, second, and third control valves;
the first control valve fluidly coupled to two of the first actuator, the second actuator, the third actuator, and a fourth actuator, the second control valve fluidly coupled to a third actuator of the plurality of actuators, and the third control valve fluidly coupled to a fourth actuator of the plurality of actuators; and the control unit for controlling the plurality of control valves.

15. The seeding implement of claim 14, further comprising:
a fluid source of hydraulic fluid;
a first flow path defined between the fluid source and the third and fourth actuators, the first flow path fluidly coupling the first actuator, the second actuator, the third actuator, and the fourth actuator in series with one another when the first control valve is in its open position, the second control valve is in its closed position, and the third control valve is in its closed position; and
a second flow path defined between the fluid source and the third and fourth actuators, the second flow path fluidly coupling at least the third and fourth actuators in parallel with one another when the first control valve is in its closed position, and either the second control valve or the third control valve is in its open position.

16. The seeding implement of claim 14, wherein the first sensor is coupled at a front end of the first frame section and a fourth sensor is coupled at a rear end thereof, the first sensor detecting a front height of the first frame section and the fourth sensor detecting a rear height of the first frame section.

17. The seeding implement of claim 16, further comprising:
a linkage pivotably to first frame section for adjustably controlling a pitch of the first frame section; and
a linkage actuator coupled to the linkage for adjusting a length of the linkage;
wherein, if a front height of the first frame section is detected not to be equal to or within a threshold limit of the rear height of the first frame section, the control unit operably actuates the linkage actuator to adjust the length of the linkage until the front height is equal to or within the threshold limit of the rear height.

18. The seeding implement of claim 17, further comprising a fluid circuit fluidly coupled to a fluid source, the fluid circuit including an additional control valve disposed in fluid communication with the linkage actuator;
wherein, the additional control valve is operably controlled to actuate the linkage actuator between a retracted position and an extended position.

19. A seeding implement, comprising:
a multi-section frame including a first frame section, a second frame section, and a third frame section, the first frame section being disposed between the second and third frame sections, where each frame section includes a front end and a rear end;
a first control system for controlling a height of each frame section relative to the other frame sections, the first control system comprising:
a first actuator coupled to the first frame section, a second actuator coupled to the second frame section, and a third actuator coupled to the third frame section;
a first sensor coupled to the first frame section, the first sensor configured to detect a first height of the first frame section from an underlying surface;
a second sensor coupled to the second frame section, the second sensor configured to detect a second height of the second frame section from the underlying surface;
a third sensor coupled to the third frame section, the third sensor configured to detect a third height of the third frame section from the underlying surface;

a control unit disposed in electrical communication with the user control, the first sensor, the second sensor, and the third sensor, the controller operably controlling the first actuator, the second actuator and the third actuator in response to the user control, the first sensor, the second sensor and the third sensor;

wherein, the control unit compares the first height, the second height, and the third height to one another and determines if each height is equal to or within a threshold limit of one another;

further wherein, when one of the first height, second height or third height is determined not to be equal to or within the threshold limit of the other two heights, the controller determines which frame section is uneven with the other two frame sections and actuates the actuator that is coupled to the uneven frame section until the first height, second height, and third height are equal or within the threshold limit of one another; and a second control system for controlling a pitch of each frame section, the second control system comprising:

a front wheel and a rear wheel coupled to and supporting each frame section, the front wheel and rear wheel adapted to move along an underlying surface;

a front wheel arm coupled to the front wheel of each frame section and pivotably coupled to the front end of the frame at a first pivot location;

a rear wheel arm coupled to the rear wheel of each frame section and pivotably coupled to the rear end of the frame at a second pivot location;

a linkage coupled to the front wheel arm and rear wheel arm of each frame section, the linkage including a linkage actuator for adjustably controlling a length of the linkage for each frame section;

a fourth sensor coupled to each frame section at or near the first pivot location, the fourth sensor configured to detect a front height of the front end of the respective frame section relative to the underlying surface;

a fifth sensor coupled to the frame section at or near the second pivot location, the fifth sensor configured to detect a rear height of the rear end of the respective frame section relative to the underlying surface;

the control unit disposed in electrical communication with the fourth sensor and the fifth sensor, the control unit operably controlling the linkage actuator based on the detected front height and rear height of each frame section.

20. The seeding implement of claim 19, wherein the linkage actuator comprises an electric actuator, hydraulic actuator, or electro-hydraulic actuator.

21. The seeding implement of claim 19, wherein the control unit compares the front height to the rear height of each frame section, and if the front height is not equal to or within a threshold limit of the rear height, the linkage actuator of the respective frame section is controllably actuated until the front height is equal to or within the threshold limit of the rear height.

22. The seeding implement of claim 19, further comprising an additional actuator coupled to each frame section and the rear wheel arm of the respective frame section, the additional actuator being actuated between a first position and a second position to raise or lower the frame section relative to the underlying surface.

23. The seeding implement of claim 19, wherein at least one of the sensors is ultrasonic, radar, optical, or laser.

24. The seeding implement of claim 19, further comprising:

a fluid source for providing hydraulic fluid;

a first control valve operably controllable between an open position and a closed position, the first control valve fluidly coupling the fluid source to the first actuator in the open position;

a second control valve operably controllable between an open position and a closed position, the second control valve fluidly coupling the fluid source to the second actuator in its open position;

a third control valve operably controllable between an open position and a closed position, the third control valve fluidly coupling the fluid source to the third actuator in its open position; and a flow path defined between the fluid source, the first actuator, the second actuator, and the third actuator, the flow path fluidly coupling the first, second and third actuators in parallel with one another.

25. The seeding implement of claim 24, wherein:

the height of the first frame section is controllably adjusted by the first actuator when the first control valve is in its open position and the second and third control valves are in their closed positions;

the height of the second frame section is controllably adjusted by the second actuator when the second control valve is in its open position and the first and third control valves are in their closed positions; and the height of the third frame section is controllably adjusted by the third actuator when the third control valve is in its open position and the first and second control valves are in their closed positions.

* * * * *